(12) United States Patent
Higuchi et al.

(10) Patent No.: US 7,826,738 B2
(45) Date of Patent: Nov. 2, 2010

(54) SEMICONDUCTOR INTEGRATED CIRCUIT DEVICE, DATA RECORDING DEVICE, AND LAYOUT METHOD FOR SEMICONDUCTOR INTEGRATED CIRCUIT DEVICE

(75) Inventors: Chisato Higuchi, Fuchu (JP); Yoshinobu Amano, Hino (JP)

(73) Assignee: Seiko Epson Corporation, Tokyo (JP)

( * ) Notice: Subject to any disclaimer, the term of this patent is extended or adjusted under 35 U.S.C. 154(b) by 483 days.

(21) Appl. No.: 12/003,838

(22) Filed: Jan. 2, 2008

(65) Prior Publication Data

US 2008/0170272 A1    Jul. 17, 2008

(30) Foreign Application Priority Data

Jan. 11, 2007   (JP)   ............................. 2007-003799
Nov. 26, 2007   (JP)   ............................. 2007-304989

(51) Int. Cl.
*G03B 17/00*   (2006.01)
*H01L 29/41*   (2006.01)
*H01L 21/00*   (2006.01)

(52) U.S. Cl. .................... 396/310; 257/448; 438/73
(58) Field of Classification Search ................. 396/310; 257/448; 438/73
See application file for complete search history.

(56) References Cited

FOREIGN PATENT DOCUMENTS

JP    A-2005-259041    9/2005
JP    A-2006-79387    3/2006

*Primary Examiner*—Evan Pert
(74) *Attorney, Agent, or Firm*—Oliff & Berridge, PLC

(57) ABSTRACT

A first image data interface section is disposed in an electrode region and an input/output buffer region provided along a first side of a semiconductor chip. A second image data interface section is disposed in an electrode region and an input/output buffer region provided along a second side. A first memory interface section is disposed in an electrode region and an input/output buffer region provided along a third side. A second memory interface section is disposed in an electrode region and an input/output buffer region provided along a fourth side.

20 Claims, 13 Drawing Sheets

SEMICONDUCTOR INTEGRATED CIRCUIT DEVICE, DATA RECORDING DEVICE, AND LAYOUT METHOD FOR SEMICONDUCTOR INTEGRATED CIRCUIT DEVICE

Japanese Patent Application No. 2007-3799, filed on Jan. 11, 2007, and Japanese Patent Application No. 2007-304989, filed on Nov. 26, 2007, are hereby incorporated by reference in their entirety.

BACKGROUND OF THE INVENTION

The present invention relates to a semiconductor integrated circuit device, a data recording device, and a layout method for a semiconductor integrated circuit device.

A drive recorder has been utilized which records image data during travel of an automobile in a primary storage device such as an SDRAM at regular time intervals. When an event such as an accident has occurred, the image data recorded within a specific period of time before and after the event has occurred is transferred from the primary storage device to a secondary storage device such as a CF memory card and recorded therein. In order to record an accident, image data is generally imaged by one camera which faces toward the front of an automobile during travel. On the other hand, a drive recorder has been utilized which is provided with two cameras and records not only an image in front of the automobile but also an image inside the automobile so that a more conscious attempt is made to prevent an accident by imaging the driver during travel, for example. When providing two cameras, it is important to synchronize image data imaged by the two cameras and to record the image data while associating pieces of image data imaged at the same time in order to ensure reliability. A recorded image cannot be used as evidence if the image data is damaged due to interference between pieces of image data imaged by the two cameras, for example. JP-A-2005-259041 discloses technology in this field, for example.

Therefore, when designing a data recording device (e.g., drive recorder) for which evidential capacity is important, it is necessary to ensure the reliability of image data while taking into account the layout of a semiconductor integrated circuit device used for the data recording device.

SUMMARY

According to a first aspect of the invention, there is provided a semiconductor integrated circuit device including a semiconductor chip, the semiconductor chip having a square or rectangular shape and including an electrode region disposed along first to fourth sides of the semiconductor chip and provided with a plurality of electrode sections, and an input/output buffer region disposed along the electrode region and provided with a plurality of input/output buffers, the semiconductor integrated circuit device comprising:

a first image data interface section including at least two of the electrode sections and at least two of the input/output buffers and providing an interface for supplying image data to the semiconductor chip; and a second image data interface section including at least two of the electrode sections and at least two of the input/output buffers and providing an interface for supplying image data to the semiconductor chip, the electrode sections and the input/output buffers of the first image data interface section being included in part of the electrode region and part of the input/output buffer region disposed along the first side of the semiconductor chip; and the electrode sections and the input/output buffers of the second image data interface section being included in part of the electrode region and part of the input/output buffer region disposed along the second side of the semiconductor chip opposite to the first side.

According to a second aspect of the invention, there is provided a data recording device comprising:

the above-described semiconductor integrated circuit device;
a first camera module;
a second camera module;
a primary storage device; and
a secondary storage device.

According to a third aspect of the invention, there is provided a layout method for a semiconductor integrated circuit device including a semiconductor chip, the semiconductor chip having a square or rectangular shape and including an electrode region disposed along first to fourth sides of the semiconductor chip and provided with a plurality of electrode sections, and an input/output buffer region disposed along the electrode region and provided with a plurality of input/output buffers, the semiconductor integrated circuit device including:

a first image data interface section including at least two of the electrode sections and at least two of the input/output buffers and providing an interface for supplying image data to the semiconductor chip;

a second image data interface section including at least two of the electrode sections and at least two of the input/output buffers and providing an interface for supplying image data to the semiconductor chip; and a first memory interface section including at least two of electrode sections and at least two of input/output buffers and providing an interface for recording the image data supplied from the first image data interface section and the second image data interface section or converted image data obtained by converting the image data in a primary storage device provided outside the semiconductor chip and for reading the recorded image data from the primary storage device, the method comprising:

including the electrode sections and the input/output buffers of the first image data interface section in part of the electrode region and part of the input/output buffer region disposed along the first side of the semiconductor chip;

including the electrode sections and the input/output buffers of the second image data interface section in part of the electrode region and part of the input/output buffer region disposed along the second side of the semiconductor chip opposite to the first side; and including at least part of the electrode sections and at least part of the input/output buffers of the first memory interface section in part of the electrode region and part of the input/output buffer region disposed along the third side of the semiconductor chip.

DETAILED DESCRIPTION OF THE EMBODIMENT

Figure 1:
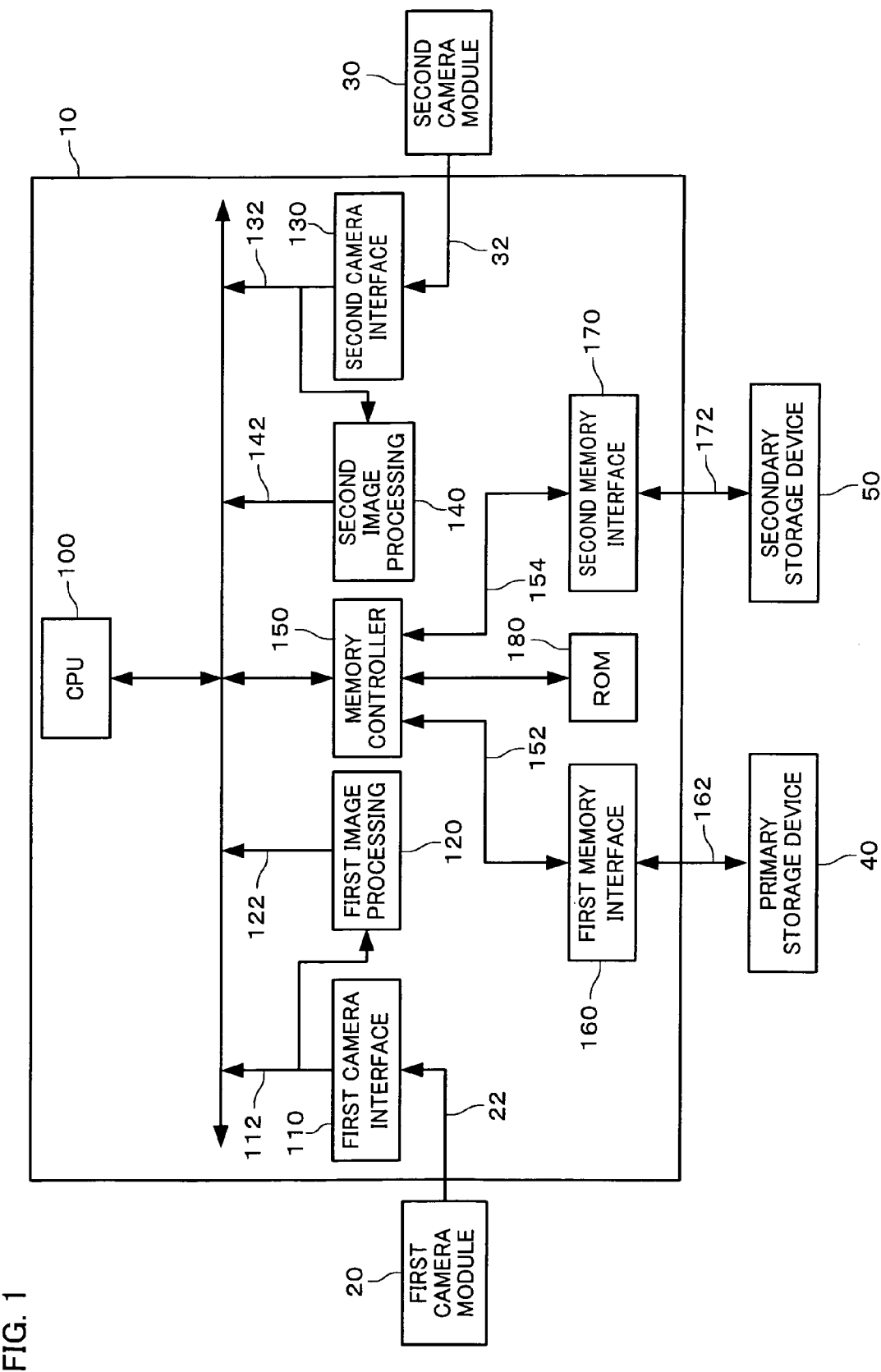
FIG. 1 is a functional block diagram showing an example of a semiconductor integrated circuit device according to one embodiment of the invention.

The invention may provide a semiconductor integrated circuit device, a data recording device, and a layout method for a semiconductor integrated circuit device including at least two image data interfaces and effectively disposing the image data interfaces and a memory interface to increase the reliability of image data.

(1) According to one embodiment of the invention, there is provided a semiconductor integrated circuit device including a semiconductor chip, the semiconductor chip having a square or rectangular shape and including an electrode region disposed along first to fourth sides of the semiconductor chip and provided with a plurality of electrode sections, and an input/output buffer region disposed along the electrode region and provided with a plurality of input/output buffers, the semiconductor integrated circuit device comprising:

a first image data interface section including at least two of the electrode sections and at least two of the input/output buffers and providing an interface for supplying image data to the semiconductor chip; and a second image data interface section including at least two of the electrode sections and at least two of the input/output buffers and providing an interface for supplying image data to the semiconductor chip, the electrode sections and the input/output buffers of the first image data interface section being included in part of the electrode region and part of the input/output buffer region disposed along the first side of the semiconductor chip; and the electrode sections and the input/output buffers of the second image data interface section being included in part of the electrode region and part of the input/output buffer region disposed along the second side of the semiconductor chip opposite to the first side.

The image data may be image data imaged by a camera module or the like, or may be image data obtained by subjecting the image data imaged by a camera module or the like to a conversion process such as JPEG encoding or interlace/progressive (IP) conversion, for example.

The semiconductor integrated circuit device including the semiconductor chip may be a semiconductor chip, a semiconductor device produced by packaging a semiconductor chip, or a semiconductor device including the semiconductor chip according to the above embodiment and another semiconductor chip, for example.

According to the above embodiment, an overlapping portion of a wiring region for interconnects connected to the first image data interface section and a wiring region for interconnects connected to the second image data interface section can be reduced when connecting signal lines manually or using an automatic routing tool by disposing the first image data interface section and the second image data interface section in the peripheral portion along opposite sides. This enables the wiring region to be reduced due to an increase in wiring efficiency, whereby the cost of the semiconductor chip can be reduced due to the reduction in area. Moreover, interference between two pieces of image data supplied from the first image data interface section and the second image data interface section to the inside of the semiconductor chip and superimposition of noise on the image data can be effectively prevented and an increase in signal propagation delay due to interconnect parasitic capacitance can be suppressed by reducing the overlapping portion of the wiring regions, whereby a high-speed operation can be achieved.

When using the semiconductor integrated circuit device according to the above embodiment for a data recording device and imaging forward and backward images, if the semiconductor integrated circuit device according to the above embodiment is disposed between a first external device (e.g., camera module) connected to the first image data interface section and a second external device (e.g., camera module) connected to the second image data interface section on a board of the data recording device, interconnects can be provided between each external device and the semiconductor integrated circuit device according to the above embodiment without causing the interconnects to intersect on the board. This facilitates board design and reduces the number of layers of the board, whereby cost can be reduced.

(2) In this semiconductor integrated circuit device, the electrode sections and the input/output buffers of the second image data interface section may be disposed opposite to the electrode sections and the input/output buffers of the first image data interface section.

According to this feature, the length of the interconnect connected to the first image data interface section and the length of the interconnect connected to the second image data interface section can be made almost equal, whereby a signal propagation delay due to the parasitic capacitances of these interconnects can be made almost equal. As a result, the image data supplied from the first image data interface section and the image data supplied from the second image data interface section can be converted and recorded in the primary storage device while correctly maintaining their relationship irrespective of whether the image data supplied from the first image data interface section and the image data supplied from the second image data interface section are processed asynchronously or synchronously in the semiconductor chip.

(3) The semiconductor integrated circuit device may further comprise:

a first memory interface section including at least two of the electrode sections and at least two of the input/output buffers and providing a primary storage interface for recording the image data supplied from the first image data interface section and the second image data interface section or converted image data obtained by converting the image data in a primary storage device provided outside the semiconductor chip and for reading the recorded image data from the primary storage device, wherein at least part of the electrode sections and at least part of the input/output buffers of the first memory interface section may be included in part of the electrode region and part of the input/output buffer region disposed along the third side of the semiconductor chip.

The electrode sections and the input/output buffers of the first memory interface section may be disposed in the electrode region and the input/output buffer region provided along the first side and the electrode region and the input/output buffer region provided along the third side.

The electrode sections and the input/output buffers of the first memory interface section may be disposed in the electrode region and the input/output buffer region provided along the second side and the electrode region and the input/output buffer region provided along the third side.

The electrode sections and the input/output buffers of the first memory interface section may be disposed in the electrode region and the input/output buffer region provided along the first side, the electrode region and the input/output buffer region provided along the second side, and the electrode region and the input/output buffer region provided along the third side.

According to this feature, since the first memory interface section is disposed along a side which differs from the sides along which the first image data interface section and the second image data interface section are disposed, data lines provided from the first image data interface section or the second image data interface section to the first memory interface section need not be disposed to pass through the center region of the semiconductor chip in which other modules and interconnects may be provided at a high density. Therefore, wiring efficiency can be increased, and superimposition of noise on the image data can be reduced.

Moreover, if a first external device (e.g., camera module) connected to the first image data interface section, a second external device (e.g., camera module) connected to the second image data interface section, and the primary storage device (e.g., SDRAM) are disposed along the first side, the second side, and the third side of the semiconductor chip on a board of a data recording device which utilizes the semiconductor integrated circuit device according to the above embodiment, interconnects provided between each of the first external device, the second external device, and the primary storage device and the semiconductor integrated circuit device according to the above embodiment need not be provided to intersect on the board. This facilitates board design and reduces the number of layers of the board, whereby cost can be reduced.

(4) In this semiconductor integrated circuit device, the electrode sections and the input/output buffers of the first image data interface section may be disposed in the electrode region and the input/output buffer region at a position close to an intersection of the first side and the third side of the semiconductor chip; and the electrode sections and the input/output buffers of the second image data interface section may be disposed in the electrode region and the input/output buffer region at a position close to an intersection of the second side and the third side of the semiconductor chip.

The statement "disposed at a position close to an intersection of the first side and the third side of the semiconductor chip" means that, when the side of the semiconductor chip opposite to the third side is referred to as a fourth side, the electrode sections and the input/output buffers are disposed at a position closer to the intersection of the first side and the third side than the intersection of the first side and the fourth side. For example, the electrode sections and the input/output buffers of the first image data interface section may be disposed in the electrode region and the input/output buffer region so that the distance between the center point of each of the majority of the electrode sections and the vertex at which the first side intersects the third side is shorter than the distance between the center point of each of the majority of the electrode sections and the vertex at which the first side intersects the fourth side. The electrode sections and the input/output buffers of the first image data interface section are preferably disposed in the electrode region and the input/output buffer region within a predetermined range close to the vertex at which the first side and the third side of the semiconductor chip intersect. For example, the electrode sections are preferably disposed sequentially in the electrode region close to the vertex at which the first side intersects the third side excluding the electrode region near the vertex at which the first side intersects the third side in which the electrode section cannot be disposed due to difficulty in bonding. The input/output buffers are preferably disposed sequentially corresponding to the electrode sections in the input/output buffer region close to the vertex at which the first side intersects the third side excluding the input/output buffer region near the vertex at which the first side intersects the third side in which the input/output buffer cannot be disposed from the viewpoint of layout.

The statement "disposed at a position close to an intersection of the second side and the third side of the semiconductor chip" means that, when the side of the semiconductor chip opposite to the third side is referred to as a fourth side, the electrode sections and the input/output buffers are disposed at a position closer to the intersection of the second side and the third side than the intersection of the second side and the fourth side. For example, the electrode sections and the input/output buffers of the second image data interface section may be disposed in the electrode region and the input/output buffer region so that the distance between the center point of each of the majority of the electrode sections and the vertex at which the second side intersects the third side is shorter than the distance between the center point of each of the majority of the electrode sections and the vertex at which the second side intersects the fourth side. The electrode sections and the input/output buffers of the second image data interface section are preferably disposed in the electrode region and the input/output buffer region within a predetermined range close to the vertex at which the second side and the third side of the semiconductor chip intersect. For example, the electrode sections are preferably disposed sequentially in the electrode region close to the vertex at which the first side intersects the third side excluding the electrode region near the vertex at which the second side intersects the third side in which the electrode section cannot be disposed due to difficulty in bonding. The input/output buffers are preferably disposed sequentially corresponding to the electrode sections in the input/output buffer region close to the vertex at which the second side intersects the third side excluding the input/output buffer region near the vertex at which the second side intersects the third side in which the input/output buffer cannot be disposed from the viewpoint of layout.

According to this feature, the distance between the first image data interface section and the first memory interface section and the distance between the second image data interface section and the first memory interface section can be reduced. Therefore, when image data supplied from a first external device (e.g., camera module) and a second external device (e.g., camera module) through the first image data interface section and the second image data interface section is recorded in the primary storage device through the first memory interface section, since the lengths of interconnects connected to the first image data interface section and the second image data interface section can be reduced, wiring efficiency can be increased. Moreover, since the operation of recording the image data in the primary storage device can be increased in speed by reducing the lengths of interconnects, the amount of image data which can be stored per unit time can be increased. Therefore, a data recording device with high reliability and high evidential capacity can be provided using the semiconductor integrated circuit device according to the above embodiment.

(5) In this semiconductor integrated circuit device, a power supply line of the first image data interface section may be separated from a power supply line of the first memory interface section in the input/output buffer region at a position close to the intersection of the first side and the third side of the semiconductor chip; and a power supply line of the second image data interface section may be separated from the power supply line of the first memory interface section in the input/output buffer region at a position close to the intersection of the second side and the third side of the semiconductor chip.

According to this feature, even if the operating voltage of the first image data interface section and the second image data interface section differs from the operating voltage of the first memory interface section, the power supplies can be separated using the input/output buffer region near the corner of the semiconductor chip which cannot be effectively utilized.

(6) In this semiconductor integrated circuit device, at least one of the electrode sections of the first memory interface section may output a select signal to the outside of the semiconductor chip, the select signal being used to selectively provide the primary storage interface or a secondary storage interface, the secondary storage interface being used to record the image data in the primary storage device or converted image data obtained by converting the image data in the primary storage device in a secondary storage device provided outside the semiconductor chip.

According to this feature, data lines from the first memory interface section to the second memory interface section become unnecessary, whereby the wiring region can be reduced. As a result, wiring efficiency can be increased.

(7) The semiconductor integrated circuit device may further comprise:

a second memory interface section including at least two of the electrode sections and at least two of the input/output buffers and providing a secondary storage interface for recording the image data in the primary storage device or converted image data obtained by converting the image data in the primary storage device in a secondary storage device provided outside the semiconductor chip, wherein at least part of the electrode sections and at least part of the input/output buffers of the second memory interface section may be included in part of the electrode region and part of the input/output buffer region disposed along the fourth side of the semiconductor chip opposite to the third side.

The electrode sections and the input/output buffers of the second memory interface section may be disposed in the electrode region and the input/output buffer region provided along the first side and the electrode region and the input/output buffer region provided along the fourth side.

The electrode sections and the input/output buffers of the second memory interface section may be disposed in the electrode region and the input/output buffer region provided along the second side and the electrode region and the input/output buffer region provided along the fourth side.

The electrode sections and the input/output buffers of the second memory interface section may be disposed in the electrode region and the input/output buffer region provided along the first side, the electrode region and the input/output buffer region provided along the second side, and the electrode region and the input/output buffer region provided along the fourth side.

According to this feature, an overlapping portion of a wiring region for data lines from the first image data interface section and the second image data interface section to the first memory interface section and a wiring region for data lines from the first memory interface section to the second memory interface section can be effectively reduced.

When applying the semiconductor integrated circuit device according to the above embodiment to a data recording device, the operation of recording image data in the primary storage device (e.g., SDRAM) must be generally performed at a significantly high speed as compared with the operation of recording image data in the secondary storage device (e.g., CF memory card or SD memory card). The operation of recording image data in the primary storage device through the first memory interface section can be increased in speed by disposing the first image data interface section and the second image data interface section near the first memory interface section.

Moreover, if a first external device (e.g., camera module) connected to the first image data interface section, a second external device (e.g., camera module) connected to the second image data interface section, the primary storage device, and the secondary storage device are disposed along the first side, the second side, the third side, and the fourth side of the semiconductor chip on a board of a data recording device which utilizes the semiconductor integrated circuit device according to the above embodiment, interconnects provided between each of the first external device, the second external device, the primary storage device, and the secondary storage device and the semiconductor integrated circuit device according to the above embodiment need not be provided to intersect on the board. This facilitates board design and reduces the number of layers of the board, whereby cost can be reduced.

(8) The semiconductor integrated circuit device may further comprise:

a third memory interface section including at least two of the electrode sections and at least two of the input/output buffers and providing the secondary storage interface or the primary storage interface, wherein at least part of the electrode sections and at least part of the input/output buffers of the third memory interface section may be included in part of the electrode region and part of the input/output buffer region disposed along the fourth side.

According to this feature, when the third memory interface section provides a secondary storage interface, an overlapping portion of a wiring region for data lines from the first image data interface section and the second image data interface section to the first memory interface section and a wiring region for data lines from the first memory interface section to the third memory interface section can be effectively reduced.

Moreover, when the third memory interface section provides a secondary storage interface, if a first external device (e.g., camera module) connected to the first image data interface section, a second external device (e.g., camera module) connected to the second image data interface section, the primary storage device, and the secondary storage device are disposed along the first side, the second side, the third side, and the fourth side of the semiconductor chip on a board of a data recording device which utilizes the semiconductor integrated circuit device according to the above embodiment, interconnects provided between each of the first external device, the second external device, the primary storage device, and the secondary storage device and the semiconductor integrated circuit device according to the above embodiment need not be provided to intersect on the board. This facilitates board design and reduces the number of layers of the board, whereby cost can be reduced.

(9) In this semiconductor integrated circuit device, part of the electrode sections and part of the input/output buffers of the third memory interface section may be disposed in part of the electrode region and part of the input/output buffer region disposed along the first side.

The electrode sections and the input/output buffers of the third memory interface section may be disposed in the electrode region and the input/output buffer region provided along the first side and the electrode region and the input/output buffer region provided along the fourth side.

The electrode sections and the input/output buffers of the second memory interface section may be disposed in the electrode region and the input/output buffer region provided along the second side and the electrode region and the input/output buffer region provided along the fourth side, and the electrode sections and the input/output buffers of the third memory interface section may be disposed in the electrode region and the input/output buffer region provided along the first side and the electrode region and the input/output buffer region provided along the fourth side.

The secondary storage device or the primary storage device connected to the third memory interface section may be a USB memory, for example. In this case, a USB controller may be disposed near the corner of the semiconductor chip at which the fourth side intersects the first side, some of the electrode sections and the input/output buffers of the third memory interface section may be disposed in the electrode region and the input/output buffer region provided along the fourth side, and the remaining electrode sections and input/output buffers of the third memory interface section may be disposed in the electrode region and the input/output buffer region provided along the first side. This enables the length of interconnects which connect the USB controller and the third memory interface section to be reduced.

(10) The semiconductor integrated circuit device may further comprise:

a first image processing section performing conversion processing on the image data supplied from the first image data interface section to the semiconductor chip; and a second image processing section performing conversion processing on the image data supplied from the second image data interface section to the semiconductor chip, wherein the first image processing section may be disposed adjacent to the first image data interface section; and wherein the second image processing section may be disposed adjacent to the second image data interface section.

According to this feature, the lengths of data lines from the first image data interface section to the first image processing section and data lines from the second image data interface section to the second image processing section can be reduced, whereby a reduction in area of the wiring region and an increase in image processing speed can be achieved.

(11) The semiconductor integrated circuit device may further comprise:

a first AD conversion section converting analog image data supplied from the first image data interface section to the semiconductor chip into digital image data; and a second AD conversion section converting analog image data supplied from the second image data interface section to the semiconductor chip into digital image data, wherein the first AD conversion section may be disposed adjacent to the first image data interface section; and wherein the second AD conversion section may be disposed adjacent to the second image data interface section.

According to this feature, the lengths of data lines from the first image data interface section to the first AD conversion section and data lines from the second image data interface section to the second AD conversion section can be reduced, whereby the area of the wiring region can be reduced.

(12) The semiconductor integrated circuit device may further comprise:

a first image processing section performing conversion processing on the digital image data converted by the first AD conversion section; and a second image processing section performing conversion processing on the digital image data converted by the second AD conversion section, wherein the first image processing section may be disposed adjacent to the first image data interface section; and wherein the second image processing section may be disposed adjacent to the second image data interface section.

According to this feature, even if the first image data interface section and the second image data interface section can input analog image data and digital image data, the lengths of data lines from the first image data interface section to the first AD conversion section, data lines from the first image data interface section to the first image processing section, data lines from the second image data interface section to the second AD conversion section, and data lines from the second image data interface section to the second image processing section can be reduced. This enables the area of the wiring region to be reduced, whereby wiring efficiency can be increased.

(13) In this semiconductor integrated circuit device, the first image data interface section may provide an interface supplying image data imaged by a first camera module provided outside the semiconductor chip or converted image data obtained by converting the image data imaged by the first camera module to the semiconductor chip; and the second image data interface section may provide an interface supplying image data imaged by a second camera module provided outside the semiconductor chip or converted image data obtained by converting the image data imaged by the second camera module to the semiconductor chip.

(14) According to one embodiment of the invention, there is provided a data recording device comprising:

the above-described semiconductor integrated circuit device;

a first camera module;

a second camera module;

a primary storage device; and a secondary storage device.

(15) According to one embodiment of the invention, there is provided a layout method for a semiconductor integrated circuit device including a semiconductor chip, the semiconductor chip having a square or rectangular shape and including an electrode region disposed along first to fourth sides of the semiconductor chip and provided with a plurality of electrode sections, and an input/output buffer region disposed along the electrode region and provided with a plurality of input/output buffers, the semiconductor integrated circuit device including:

a first image data interface section including at least two of the electrode sections and at least two of the input/output buffers and providing an interface for supplying image data to the semiconductor chip;

a second image data interface section including at least two of the electrode sections and at least two of the input/output buffers and providing an interface for supplying image data to the semiconductor chip; and a first memory interface section including at least two of electrode sections and at least two of input/output buffers and providing an interface for recording the image data supplied from the first image data interface section and the second image data interface section or converted image data obtained by converting the image data in a primary storage device provided outside the semiconductor chip and for reading the recorded image data from the primary storage device, the method comprising:

including the electrode sections and the input/output buffers of the first image data interface section in part of the electrode region and part of the input/output buffer region disposed along the first side of the semiconductor chip;

including the electrode sections and the input/output buffers of the second image data interface section in part of the electrode region and part of the input/output buffer region disposed along the second side of the semiconductor chip opposite to the first side; and including at least part of the electrode sections and at least part of the input/output buffers of the first memory interface section in part of the electrode region and part of the input/output buffer region disposed along the third side of the semiconductor chip.

According to one embodiment of the invention, there is provided a semiconductor integrated circuit device that includes a semiconductor chip, the semiconductor chip having a square or rectangular shape and including an electrode region provided with a plurality of electrode sections in a peripheral portion along each side of the semiconductor chip, and an input/output buffer region provided with a plurality of input/output buffers along the electrode region, the semiconductor integrated circuit device comprising:

a first camera interface section that includes a plurality of electrode sections and a plurality of input/output buffers and provides an interface that supplies image data imaged by a first camera module provided outside the semiconductor chip to the inside of the semiconductor chip; and a second camera interface section that includes a plurality of electrode sections and a plurality of input/output buffers and provides an interface that supplies image data imaged by a second camera module provided outside the semiconductor chip to the inside of the semiconductor chip, the plurality of electrode sections and the plurality of input/output buffers of the first camera interface section being disposed in at least part of the electrode region and the input/output buffer region provided along a first side of the semiconductor chip; and the plurality of electrode sections and the plurality of input/output buffers of the second camera interface section being disposed in at least part of the electrode region and the input/output buffer region provided along a second side of the semiconductor chip opposite to the first side.

The semiconductor integrated circuit device including the semiconductor chip may be a semiconductor chip, a semiconductor device produced by packaging a semiconductor chip, or a semiconductor device including the semiconductor chip according to the above embodiment and another semiconductor chip, for example.

According to the above embodiment, an overlapping portion of a wiring region for interconnects connected to the first camera interface section and a wiring region for interconnects connected to the second camera interface section can be reduced when connecting signal lines manually or using an automatic routing tool by disposing the first camera interface section and the second camera interface section in the peripheral portion along opposite sides. This enables the wiring region to be reduced due to an increase in wiring efficiency, whereby the cost of the semiconductor chip can be reduced due to the reduction in area. Moreover, interference between two pieces of image data supplied from the first camera interface section and the second camera interface section to the inside of the semiconductor chip and superimposition of noise on the image data can be effectively prevented and an increase in signal propagation delay due to interconnect parasitic capacitance can be suppressed by reducing the overlapping portion of the wiring regions, whereby a high-speed operation can be achieved.

When using the semiconductor integrated circuit device according to the above embodiment for a data recording device and imaging forward and backward images, if the semiconductor integrated circuit device according to the above embodiment is disposed between the two camera modules on a board of the data recording device, interconnects can be provided between each camera module and the semiconductor integrated circuit device according to the above embodiment without causing the interconnects to intersect on the board. This facilitates board design and reduces the number of layers of the board, whereby cost can be reduced.

In the semiconductor integrated circuit device according to the above embodiment, the plurality of electrode sections and the plurality of input/output buffers of the second camera interface section may be disposed opposite to the plurality of electrode sections and the plurality of input/output buffers of the first camera interface section.

According to this feature, the length of the interconnect connected to the first camera interface section and the length of the interconnect connected to the second camera interface section can be made almost equal, whereby a signal propagation delay due to the parasitic capacitances of these interconnects can be made almost equal. As a result, the image data imaged by the first camera module and the image data imaged by the second camera module can be converted and recorded in the primary storage device while correctly maintaining their relationship irrespective of whether the image data imaged by the first camera module and the image data imaged by the second camera module are processed asynchronously or synchronously in the semiconductor chip.

The semiconductor integrated circuit device according to the above embodiment may include:

a first memory interface section that includes a plurality of electrode sections and a plurality of input/output buffers and provides a primary storage interface that records image data supplied from the first camera interface section and the second camera interface section to the inside of the semiconductor chip or image data obtained by converting the image data supplied from the first camera interface section and the second camera interface section in a primary storage device provided outside the semiconductor chip and reads the recorded image data from the primary storage device, wherein the plurality of electrode sections and the plurality of input/output buffers of the first memory interface section may be disposed in the electrode region and the input/output buffer region provided along a third side of the semiconductor chip.

According to this feature, since the first memory interface section is disposed along a side which differs from the sides along which the first camera interface section and the second camera interface section are disposed, data lines provided from the first camera interface section or the second camera interface section to the first memory interface section need not be disposed to pass through the center region of the semiconductor chip in which other modules and interconnects may be provided at a high density. Therefore, wiring efficiency can be increased, and superimposition of noise on the image data can be reduced.

Moreover, if the first camera module, the second camera module, and the primary storage device are disposed along the first side, the second side, and the third side of the semiconductor chip on a board of a data recording device which utilizes the semiconductor integrated circuit device according to the above embodiment, interconnects provided between each of the first camera module, the second camera module, and the primary storage device and the semiconductor integrated circuit device according to the above embodiment need not be provided to intersect on the board. This facilitates board design and reduces the number of layers of the board, whereby cost can be reduced.

In the semiconductor integrated circuit device according to the above embodiment, the plurality of electrode sections and the plurality of input/output buffers of the first camera interface section may be disposed in the electrode region and the input/output buffer region at a position close to an intersection of the first side and the third side of the semiconductor chip; and the plurality of electrode sections and the plurality of input/output buffers of the second camera interface section may be disposed in the electrode region and the input/output buffer region at a position close to an intersection of the second side and the third side of the semiconductor chip.

The statement "disposed at a position close to an intersection of the first side and the third side of the semiconductor chip" means that, when the side of the semiconductor chip opposite to the third side is referred to as a fourth side, the electrode sections and the input/output buffers are disposed at a position closer to the intersection of the first side and the third side than the intersection of the first side and the fourth side. For example, the electrode sections and the input/output buffers of the first camera interface section may be disposed in the electrode region and the input/output buffer region so that the distance between the center point of each of the majority of the electrode sections and the vertex at which the first side intersects the third side is shorter than the distance between the center point of each of the majority of the electrode sections and the vertex at which the first side intersects the fourth side. The electrode sections and the input/output buffers of the first camera interface section are preferably disposed in the electrode region and the input/output buffer region within a predetermined range close to the vertex at which the first side and the third side of the semiconductor chip intersect. For example, the electrode sections are preferably disposed sequentially in the electrode region close to the vertex at which the first side intersects the third side excluding the electrode region near the vertex at which the first side intersects the third side in which the electrode section cannot be disposed due to difficulty in bonding. The input/output buffers are preferably disposed sequentially corresponding to the electrode sections in the input/output buffer region close to the vertex at which the first side intersects the third side excluding the input/output buffer region near the vertex at which the first side intersects the third side in which the input/output buffer cannot be disposed from the viewpoint of layout.

The statement "disposed at a position close to an intersection of the second side and the third side of the semiconductor chip" means that, when the side of the semiconductor chip opposite to the third side is referred to as a fourth side, the electrode sections and the input/output buffers are disposed at a position closer to the intersection of the second side and the third side than the intersection of the second side and the fourth side. For example, the electrode sections and the input/output buffers of the second camera interface section may be disposed in the electrode region and the input/output buffer region so that the distance between the center point of each of the majority of the electrode sections and the vertex at which the second side intersects the third side is shorter than the distance between the center point of each of the majority of the electrode sections and the vertex at which the second side intersects the fourth side. The electrode sections and the input/output buffers of the second camera interface section are preferably disposed in the electrode region and the input/output buffer region within a predetermined range close to the vertex at which the second side and the third side of the semiconductor chip intersect. For example, the electrode sections are preferably disposed sequentially in the electrode region close to the vertex at which the first side intersects the third side excluding the electrode region near the vertex at which the second side intersects the third side in which the electrode section cannot be disposed due to difficulty in bonding. The input/output buffers are preferably disposed sequentially corresponding to the electrode sections in the input/output buffer region close to the vertex at which the second side intersects the third side excluding the input/output buffer region near the vertex at which the second side intersects the third side in which the input/output buffer cannot be disposed from the viewpoint of layout.

According to the above embodiment, the distance between the first camera interface section and the first memory interface section and the distance between the second camera interface section and the first memory interface section can be reduced. Therefore, when image data imaged by two camera modules and supplied through the first camera interface section and the second camera interface section is recorded in the primary storage device through the first memory interface section, since the lengths of interconnects connected to the first camera interface section and the second camera interface section can be reduced, wiring efficiency can be increased. Moreover, since the operation of recording the image data in the primary storage device can be increased in speed by reducing the lengths of interconnects, the amount of image data which can be stored per unit time can be increased. Therefore, a data recording device with high reliability and high evidential capacity can be provided using the semiconductor integrated circuit device according to the above embodiment.

In the semiconductor integrated circuit device according to the above embodiment, a power supply line of the first camera interface section may be separated from a power supply line of the first memory interface section in the input/output buffer region near the intersection of the first side and the third side of the semiconductor chip; and a power supply line of the second camera interface section may be separated from a power supply line of the first memory interface section in the input/output buffer region near the intersection of the second side and the third side of the semiconductor chip.

According to this feature, even if the operating voltage of the first camera interface section and the second camera interface section differs from the operating voltage of the first memory interface section, the power supplies can be separated using the input/output buffer region near the corner of the semiconductor chip which cannot be effectively utilized.

The semiconductor integrated circuit device according to the above embodiment may include:

a second memory interface section that includes a plurality of electrode sections and a plurality of input/output buffers and provides a secondary storage interface that records image data recorded in the primary storage device or image data obtained by converting the image data recorded in the primary storage device in a secondary storage device provided outside the semiconductor chip, wherein the plurality of electrode sections and the plurality of input/output buffers of the second memory interface section may be disposed in at least part of the electrode region and the input/output buffer region provided along a fourth side of the semiconductor chip opposite to the third side.

According to this feature, an overlapping portion of a wiring region for data lines from the camera interface section and the second camera interface section to the first memory interface section and a wiring region for data lines from the first memory interface section to the second memory interface section can be effectively reduced.

When applying the semiconductor integrated circuit device according to the above embodiment to a data recording device, the operation of recording image data in the primary storage device must be generally performed at a significantly high speed as compared with the operation of recording image data in the secondary storage device. The operation of recording image data in the primary storage device through the first memory interface section can be increased in speed by disposing the first camera interface section and the second camera interface section near the first memory interface section.

Moreover, if the first camera module, the second camera module, the primary storage device, and the secondary storage device are disposed along the first side, the second side, the third side, and the fourth side of the semiconductor chip on a board of a data recording device which utilizes the semiconductor integrated circuit device according to the above embodiment, interconnects provided between each of the first camera module, the second camera module, the primary storage device, and the secondary storage device and the semiconductor integrated circuit device according to the above embodiment need not be provided to intersect on the board. This facilitates board design and reduces the number of layers of the board, whereby cost can be reduced.

In the semiconductor integrated circuit device according to the above embodiment, the first memory interface section may include at least one electrode section that outputs a select signal to the outside of the semiconductor chip, the select signal being used to selectively provide the first the storage interface or a secondary storage interface that records image data recorded in the primary storage device or image data obtained by converting the image data recorded in the primary storage device in a secondary storage device provided outside the semiconductor chip.

According to this feature, data lines from the first memory interface section to the second memory interface section become unnecessary, whereby the wiring region can be reduced. As a result, wiring efficiency can be increased.

The semiconductor integrated circuit device according to the above embodiment may include:

a first image processing section that converts image data supplied from the first camera interface section to the inside of the semiconductor chip; and a second image processing section that converts image data supplied from the second camera interface section to the inside of the semiconductor chip, wherein the first image processing section may be disposed adjacent to the first camera interface section; and wherein the second image processing section may be disposed adjacent to the second camera interface section.

According to this feature, the lengths of data lines from the first camera interface section to the first image processing section and data lines from the second camera interface section to the second image processing section can be reduced, whereby a reduction in area of the wiring region and an increase in image processing speed can be achieved.

The semiconductor integrated circuit device according to the above embodiment may include:

a first AD conversion section that converts analog image data supplied from the first camera interface section to the inside of the semiconductor chip into digital image data; and a second AD conversion section that converts analog image data supplied from the second camera interface section to the inside of the semiconductor chip into digital image data, wherein the first AD conversion section may be disposed adjacent to the first camera interface section; and wherein the second AD conversion section may be disposed adjacent to the second camera interface section.

According to this feature, the lengths of data lines from the first camera interface section to the first AD conversion section and data lines from the second camera interface section to the second AD conversion section can be reduced, whereby the area of the wiring region can be reduced.

The semiconductor integrated circuit device according to the above embodiment may include:

a first image processing section that converts the image data converted by the first AD conversion section; and a second image processing section that converts the image data converted by the second AD conversion section, wherein the first image processing section may be disposed adjacent to the first camera interface section; and wherein the second image processing section may be disposed adjacent to the second camera interface section.

According to this feature, even if the first camera interface section and the second camera interface section can input analog image data and digital image data, the lengths of data lines from the first camera interface section to the first AD conversion section, data lines from the first camera interface section to the first image processing section, data lines from the second camera interface section to the second AD conversion section, and data lines from the second camera interface section to the second image processing section can be reduced. This enables the area of the wiring region to be reduced, whereby wiring efficiency can be increased.

According to one embodiment of the invention, there is provided a data recording device comprising the above semiconductor integrated circuit device, a first camera module, a second camera module, a primary storage device, and a secondary storage device.

According to one embodiment of the invention, there is provided a layout method for a semiconductor integrated circuit device that includes a semiconductor chip, the semiconductor chip having a square or rectangular shape and including an electrode region provided with a plurality of electrode sections in a peripheral portion along each side of the semiconductor chip, and an input/output buffer region provided with a plurality of input/output buffers along the electrode region, the semiconductor integrated circuit device including a first camera interface section that includes a plurality of electrode sections and a plurality of input/output buffers and provides an interface that supplies image data to the inside of the semiconductor chip, a second camera interface section that includes a plurality of electrode sections and a plurality of input/output buffers and provides an interface that supplies image data to the inside of the semiconductor chip, and a first memory interface section that includes a plurality of electrode sections and a plurality of input/output buffers and provides a primary storage interface that records image data supplied from the first camera interface section and the second camera interface section to the inside of the semiconductor chip or image data obtained by converting the image data supplied from the first camera interface section and the second camera interface section in a primary storage device provided outside the semiconductor chip and reads the recorded image data from the primary storage device, the method comprising:

disposing the plurality of electrode sections and the plurality of input/output buffers of the first camera interface section in at least part of the electrode region and the input/output buffer region provided along a first side of the semiconductor chip;

disposing the plurality of electrode sections and the plurality of input/output buffers of the second camera interface section in at least part of the electrode region and the input/output buffer region provided along a second side of the semiconductor chip opposite to the first side; and disposing the plurality of electrode sections and the plurality of input/output buffers of the first memory interface section in at least part of the electrode region and the input/output buffer region provided along a third side of the semiconductor chip.

Preferred embodiments of the invention are described in detail below with reference to the drawings. Note that the embodiments described hereunder do not in any way limit the scope of the invention defined by the claims laid out herein. Note also that all elements described below should not be necessarily taken as essential requirements for the invention.

1. Semiconductor Integrated Circuit Device

FIG. 1 is a functional block diagram showing a semiconductor integrated circuit device according to one embodiment of the invention. A semiconductor integrated circuit device 10 may include a CPU 100, a memory controller 150, and a ROM 180. The CPU 100 controls the operation of the semiconductor integrated circuit device 10 by reading a program stored in the ROM 180 through the memory controller 150 and executing each instruction of the program.

The semiconductor integrated circuit device 10 includes a first camera interface section 110 which functions as a first image data interface section. The first camera interface section 110 provides an interface which supplies image data 22 imaged by a first camera module 20 to the inside of the semiconductor integrated circuit device 10. For example, when the image data 22 is digital image data, the first camera interface section 110 may be a level shifter which shifts the voltage level of the image data 22 in conformity with the internal power supply voltage of the semiconductor integrated circuit device 10, or may be a digital input buffer when the voltage level of the image data 22 conforms to the internal power supply voltage of the semiconductor integrated circuit device 10. When the image data 22 is analog image data, the first camera interface section 110 may be an analog input buffer.

The semiconductor integrated circuit device 10 includes a first image processing section 120. The first image processing section 120 converts image data 112 output from the first camera interface section 110. The first image processing section 120 may be a JPEG encoder/decoder which compresses or decompresses still image data, an MPEG encoder/decoder which compresses or decompresses video image data, or an interlace-to-progressive (IP) converter, for example. When the image data 22 is analog image data, an AD converter may be connected to the output of the first camera interface section 110 (e.g., analog input buffer). The analog image data may be converted into digital image data using the AD converter, and the digital image data may be supplied to the first image processing section 120.

The semiconductor integrated circuit device 10 includes a second camera interface section 130 which functions as a second image data interface section. The second camera interface section 130 provides an interface which supplies image data 32 imaged by a second camera module 30 to the inside of the semiconductor integrated circuit device 10. For example, when the image data 32 is digital image data, the second camera interface section 130 may be a level shifter which shifts the voltage level of the image data 32 in conformity with the internal power supply voltage of the semiconductor integrated circuit device 10, or may be a digital input buffer when the voltage level of the image data 32 conforms to the internal power supply voltage of the semiconductor integrated circuit device 10. When the image data 32 is analog image data, the second camera interface section 130 may be an analog input buffer. The first camera interface section 110 and the second camera interface section 130 need not have an identical configuration. The first camera interface section 110 and the second camera interface section 130 may have different configurations when the image data 22 and the image data 32 are pieces of digital image data which differ in the number of bits, or when one of the image data 22 and the image data 32 is analog image data and the other is digital image data, for example.

The semiconductor integrated circuit device 10 includes a second image processing section 140. The second image processing section 140 converts image data 132 output from the second camera interface section 130. The second image processing section 140 may be a JPEG encoder/decoder which compresses or decompresses still image data, an MPEG encoder/decoder which compresses or decompresses video image data, or an IP converter, for example. When the image data 32 is analog image data, an AD converter may be connected to the output of the second camera interface section 130 (e.g., analog input buffer). The analog image data may be converted into digital image data using the AD converter, and the digital image data may be supplied to the second image processing section 140.

The semiconductor integrated circuit device 10 includes a first memory interface section 160. The first memory interface section 160 provides a primary storage interface which records the image data 112 and the image data 132 respectively supplied from the first camera interface section 110 and the second camera interface section 130 or image data 122 and image data 142 obtained by converting the image data 112 and the image data 132 in a primary storage device 40, and reads the recorded image data from the primary storage device 40. The first memory interface section 160 may be a level shifter which shifts the voltage level of image data 162 or 152 in conformity with the internal power supply voltage of the semiconductor integrated circuit device 10 or the power supply voltage of the primary storage device 40, or may be a digital input/output buffer when the internal power supply voltage of the semiconductor integrated circuit device 10 coincides with the power supply voltage of the primary storage device 40, for example.

The semiconductor integrated circuit device 10 includes a second memory interface section 170. The second memory interface section 170 provides a secondary storage interface which records the image data recorded in the primary storage device 40 or image data obtained by converting the image data recorded in the primary storage device 40 in a secondary storage device 50. The second memory interface section 170 may be a level shifter which shifts the voltage level of image data 172 or 154 in conformity with the internal power supply voltage of the semiconductor integrated circuit device 10 or the power supply voltage of the secondary storage device 50, or may be a digital input/output buffer when the internal power supply voltage of the semiconductor integrated circuit device 10 coincides with the power supply voltage of the secondary storage device 50, for example.

Figure 2:
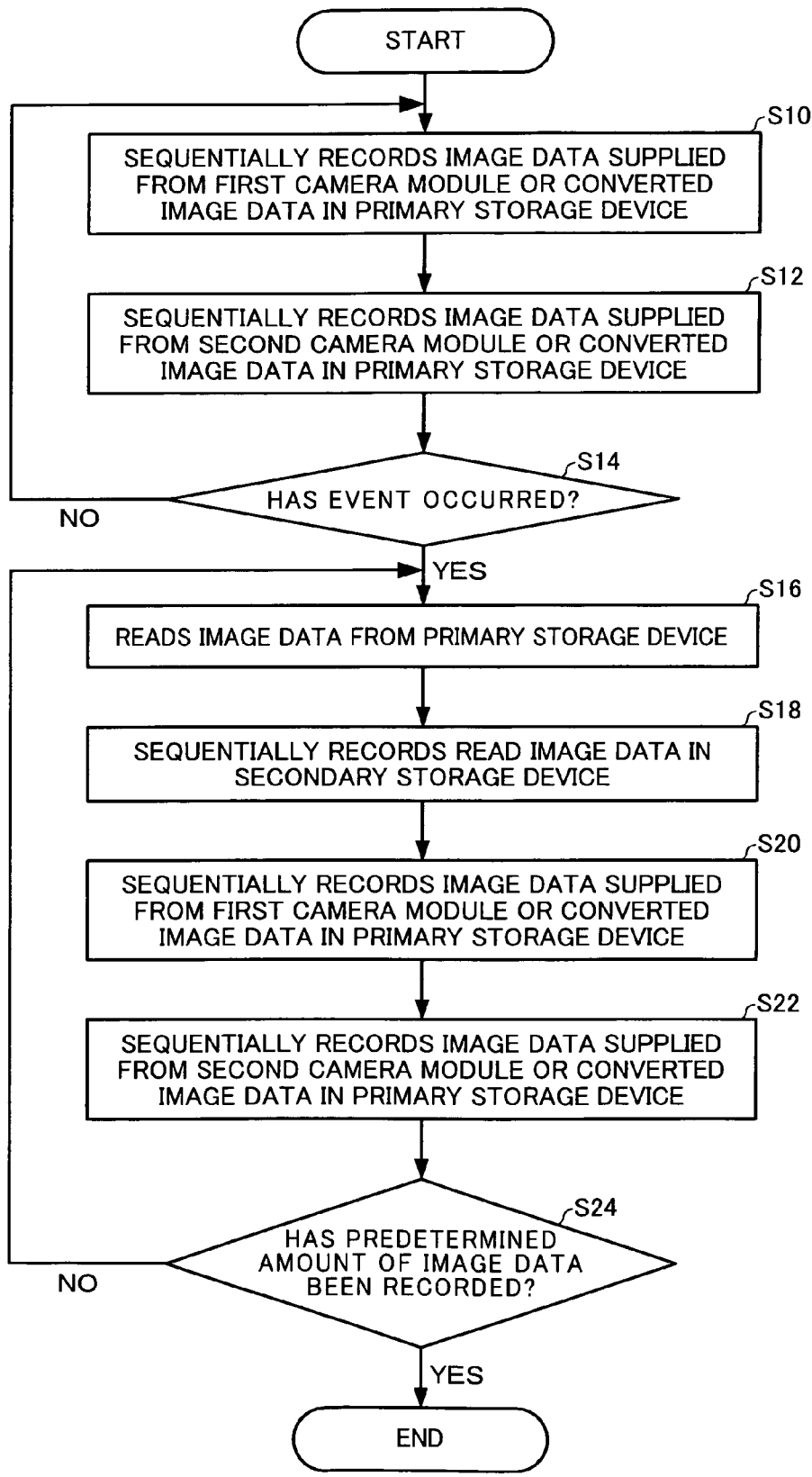
FIG. 2 is a flowchart illustrative of an example of an operation flow when applying a semiconductor integrated circuit device according to one embodiment of the invention to a data recording device.

The semiconductor integrated circuit device 10 may have a configuration in which the first camera interface section 110 and the second camera interface section 130 corresponding to the first camera module and the second camera module are replaced by a first image data interface section and a second image data interface section corresponding to another interface. For example, the first image data interface section and the second image data interface section may have an interface corresponding to a JPEG encoder IC or an IP conversion IC. FIG. 2 is a diagram illustrative of an example of an operation flow when applying the semiconductor integrated circuit device according to this embodiment to a data recording device. The operation flow is described below with reference to FIG. 1.

The CPU 100 cyclically and sequentially records the image data 112 received by the first camera interface section 110 (i.e., image data 22 imaged by and supplied from the first camera module 20 at regular time intervals) or the image data 122 converted by the first image processing section 120 in a predetermined storage area of the primary storage device 40 through the first memory interface section 160 (step S10).

Likewise, the CPU 100 cyclically and sequentially records the image data 132 received by the second camera interface section 130 (i.e., image data 32 imaged by and supplied from the second camera module 30 at regular time intervals) or the image data 142 converted by the second image processing section 140 in a predetermined storage area of the primary storage device 40 through the first memory interface section 160 (step S12).

In the steps S10 and S12, when the first image processing section 120 and the second image processing section 140 have a direct memory access (DMA) transfer function, the first image processing section 120 and the second image processing section 140 may directly record the image data 122 and the image data 142 in the primary storage device 40 through the first memory interface section 160. In this case, load imposed on the CPU 100 can be reduced.

The CPU 100 records the image data in the primary storage device 40 at regular time intervals until a predetermined event occurs (e.g., the output from an acceleration sensor (not shown) exceeds a threshold value) (steps S10 to S14). When a predetermined event has occurred, the CPU 100 sequentially reads part of the image data (e.g., image data recorded within 15 seconds before the event has occurred) recorded in the primary storage device 40 in the steps S10 and S12 (step S16), and records the read data in the secondary storage device 50 through the second memory interface section 170 (step S18).

The CPU 100 cyclically and sequentially records the image data 132 received by the second camera interface section 130 (i.e., image data 32 imaged by and supplied from the second camera module 30 at regular intervals) or the image data 142 converted by the second image processing section 140 in a predetermined storage area of the primary storage device 40 through the first memory interface section 160 (step S22).

The CPU 100 sequentially records the image data in the secondary storage device 50 and the primary storage device 40 until a specific amount of image data (e.g., image data recorded within 15 seconds before the event has occurred and image data recorded within five seconds after the event has occurred) is recorded in the secondary storage device 50 (steps S16 to S24). As a result, necessary image data before and after a predetermined event has occurred can be recorded in the secondary storage device 50 and stored for a long time.

Figure 3:
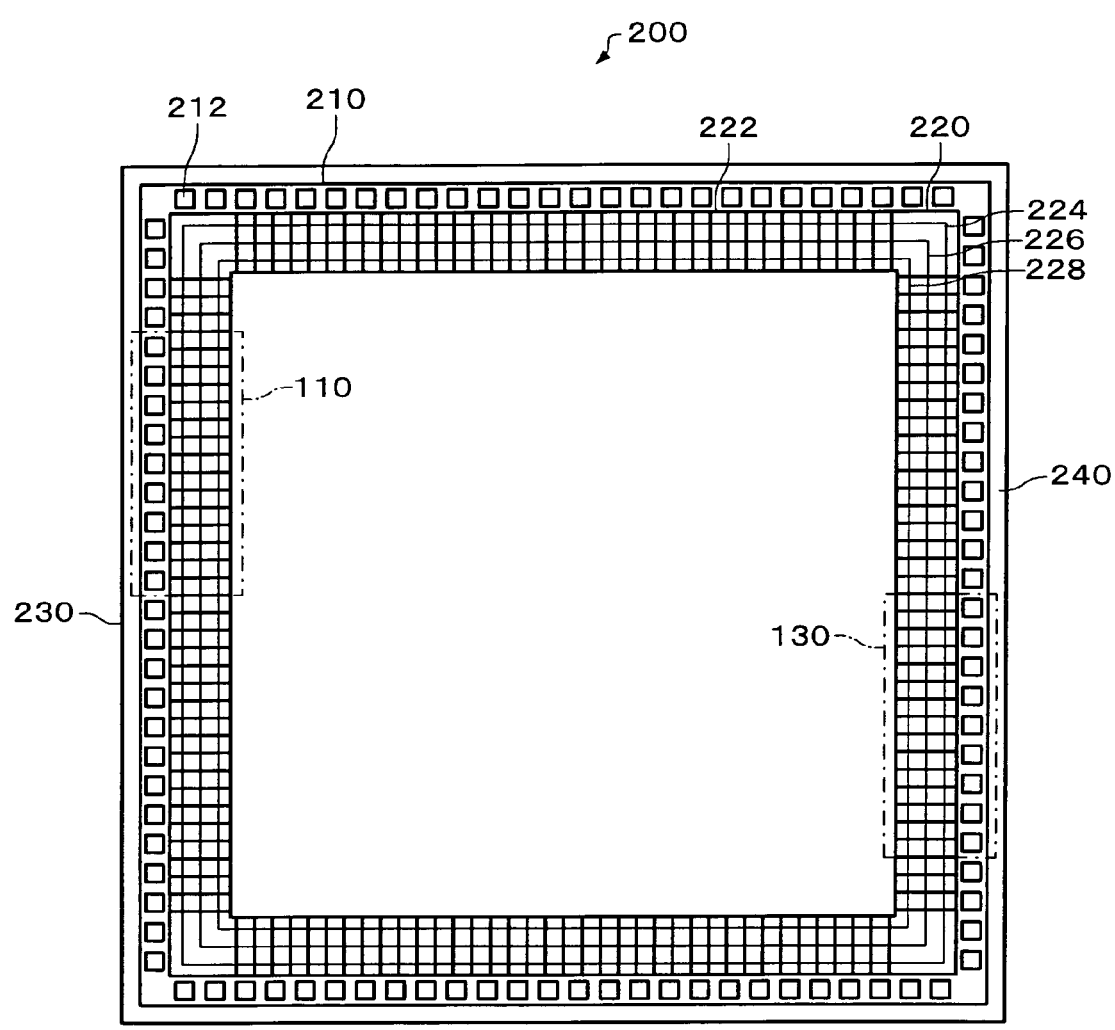
FIG. 3 is a diagram illustrative of an arrangement example of a first camera interface section and a second camera interface section in a semiconductor integrated circuit device according to one embodiment of the invention.

FIG. 3 is a diagram illustrative of an arrangement example of the first camera interface section and the second camera interface section in the semiconductor integrated circuit device according to this embodiment. A semiconductor chip 200 included in the semiconductor integrated circuit device according to this embodiment has a square or rectangular shape, and includes an electrode region 210 in which electrode sections 212 are disposed in the peripheral portion along each side of the semiconductor chip 200, and an input/output buffer region 220 in which input/output buffers 222 are disposed along the electrode region 210.

The electrode section 212 is used to input a signal from the outside of the semiconductor chip 200 or to output a signal to the outside of the semiconductor chip 200. Each input/output buffer 222 is connected to the electrode section 212, and functions as a level shifter which shifts the voltage level of a signal input to the electrode section 212 in conformity with the internal operating voltage level of the semiconductor chip 200 and supplies the voltage level to the inside of the semiconductor chip 200, or shifts the internal operating voltage level of the semiconductor chip 200 in conformity with the operating voltage level of an external module and outputs the voltage level through the electrode section 212. The input/output buffer 222 is provided with at least a high power supply voltage (HVDD) supply line, a low power supply voltage (LVDD) supply line, and a ground potential (VSS) supply line. For example, when the internal power supply voltage is the voltage LVDD and the power supply voltage of an external module is the voltage HVDD, the input/output buffer 222 functions as a level shifter which converts the power supply voltage from the voltage HVDD (e.g., 2.4 to 3.6 V) into the voltage LVDD (e.g., 1.8 V) or converts the power supply voltage from the voltage LVDD into the voltage HVDD. When the power supply voltage coincides with the internal power supply voltage of an external module, the input/output buffer 222 may be allowed to merely function as a buffer by short-circuiting the high power supply voltage supply line and the low power supply voltage supply line. The input/output buffer 212 may be a buffer which allows only input, a buffer which allows only output, or a buffer which allows input and output. A high power supply voltage (HVDD) supply line 224, a low power supply voltage (LVDD) supply line 226, and a ground potential (VSS) supply line 228 are provided in the input/output buffer region 220 in the shape of a ring by adjacently disposing the input/output buffers 222, and the potentials HVDD, LVDD, and VSS are supplied from predetermined electrode sections 212. Since the input/output buffer 222 cannot be disposed near the four corners of the semiconductor chip 200, only each supply line is provided to form a ring shape.

An overlapping portion of a wiring region for interconnects connected to the first camera interface section 110 and a wiring region for interconnects connected to the second camera interface section 130 can be reduced when connecting signal lines manually or using an automatic routing tool by disposing the first camera interface section 110 and the second camera interface section 130 in the peripheral portion along opposite sides. This enables the wiring region to be reduced due to an increase in wiring efficiency, whereby the cost of the semiconductor chip 200 can be reduced due to the reduction in area. Moreover, interference between two pieces of image data supplied from the first camera interface section 110 and the second camera interface section 130 to the inside of the semiconductor chip 200 and superimposition of noise on the image data can be effectively prevented and an increase in signal propagation delay due to interconnect parasitic capacitance can be suppressed by reducing the overlapping portion of the wiring regions, whereby a high-speed operation can be achieved.

Figure 4:
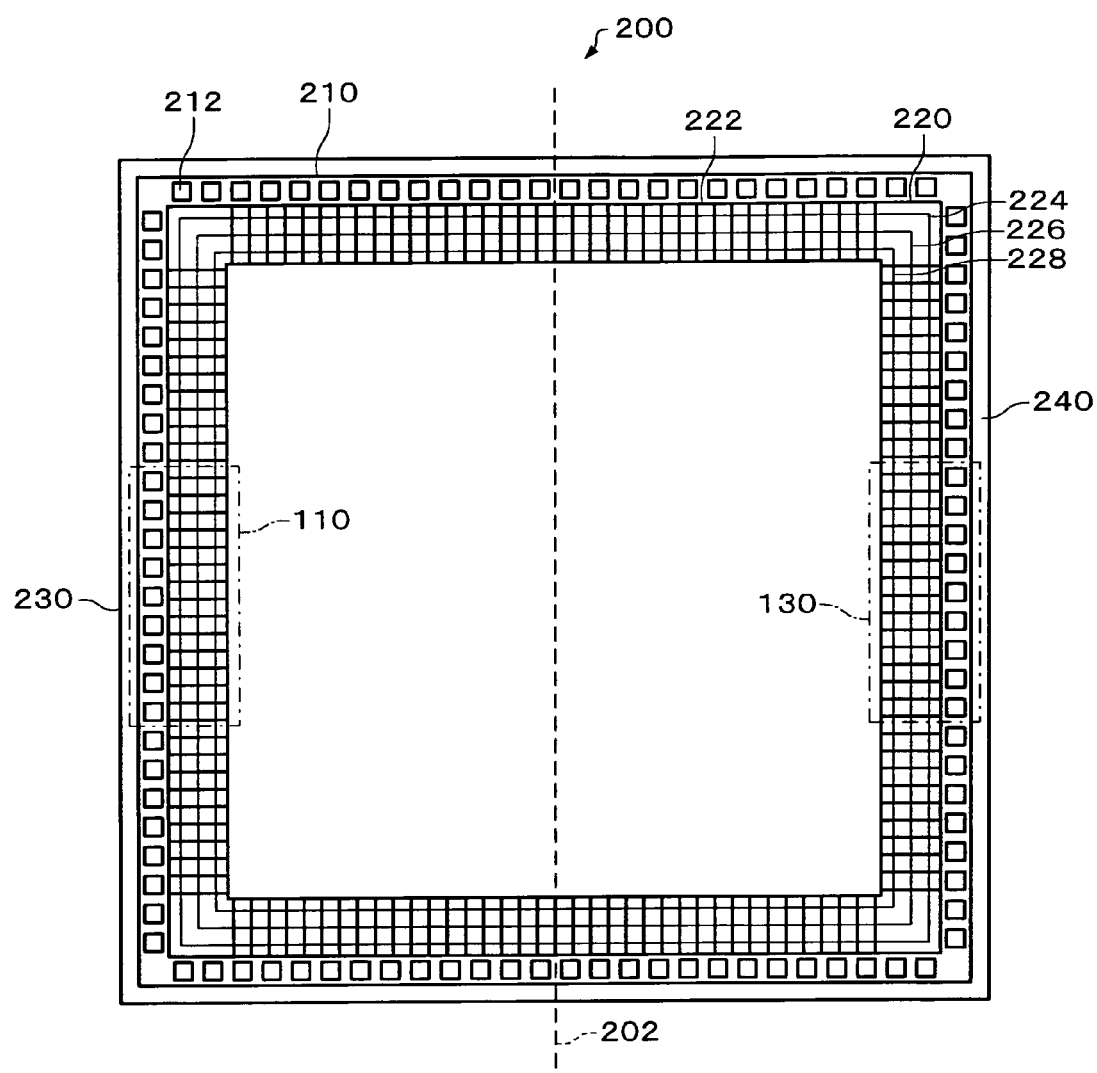
FIG. 4 is a diagram illustrative of another arrangement example of a first camera interface section and a second camera interface section in a semiconductor integrated circuit device according to one embodiment of the invention.

FIG. 4 is a diagram illustrative of another arrangement example of the first camera interface section and the second camera interface section in the semiconductor integrated circuit device according to this embodiment. The same elements as in FIG. 3 are indicated by the same symbols. Description of these elements is omitted. The electrode sections 212 and the input/output buffers 222 of the first camera interface section 110 are disposed in at least part of the electrode region 210 and the input/output buffer region 220 provided along a first side (230) of the semiconductor chip 200. The electrode sections 212 and the input/output buffers 222 of the second camera interface section 130 are disposed in the electrode region 210 and the input/output buffer region 220 provided along a second side (240) to be opposite to the electrode sections 212 and the input/output buffers 222 of the first camera interface section 110. For example, the electrode sections 212 and the input/output buffers 222 of the first camera interface section 110 and the electrode sections 212 and the input/output buffers 222 of the second camera interface section 130 are disposed at line-symmetrical positions with respect to a centerline 202 of the semiconductor chip 200. When the number of electrode sections of the first camera interface section 110 differs from the number of electrode sections of the second camera interface section 130, the electrode section located at the center of the first camera interface section 110 and the electrode section located at the center of the second camera interface section 130 are disposed at line-symmetrical positions with respect to the centerline 202 of the semiconductor chip 200.

The length of the interconnect connected to the first camera interface section 110 and the length of the interconnect connected to the second camera interface section 130 can be easily made almost equal (i.e., these interconnects are made symmetrical in FIG. 4) by disposing the first camera interface section 110 and the second camera interface section 130 in the peripheral portion along opposite sides, whereby a signal propagation delay due to the parasitic capacitances of these interconnects can be made almost equal. As a result, the image data imaged by the first camera module and the image data imaged by the second camera module can be converted and recorded in the primary storage device while correctly maintaining their relationship irrespective of whether the image data imaged by the first camera module and the image data imaged by the second camera module are processed asynchronously or synchronously in the semiconductor chip 200. Therefore, a data recording device with high reliability and high evidential capacity can be provided using the semiconductor integrated circuit device according to this embodiment.

Figure 5:
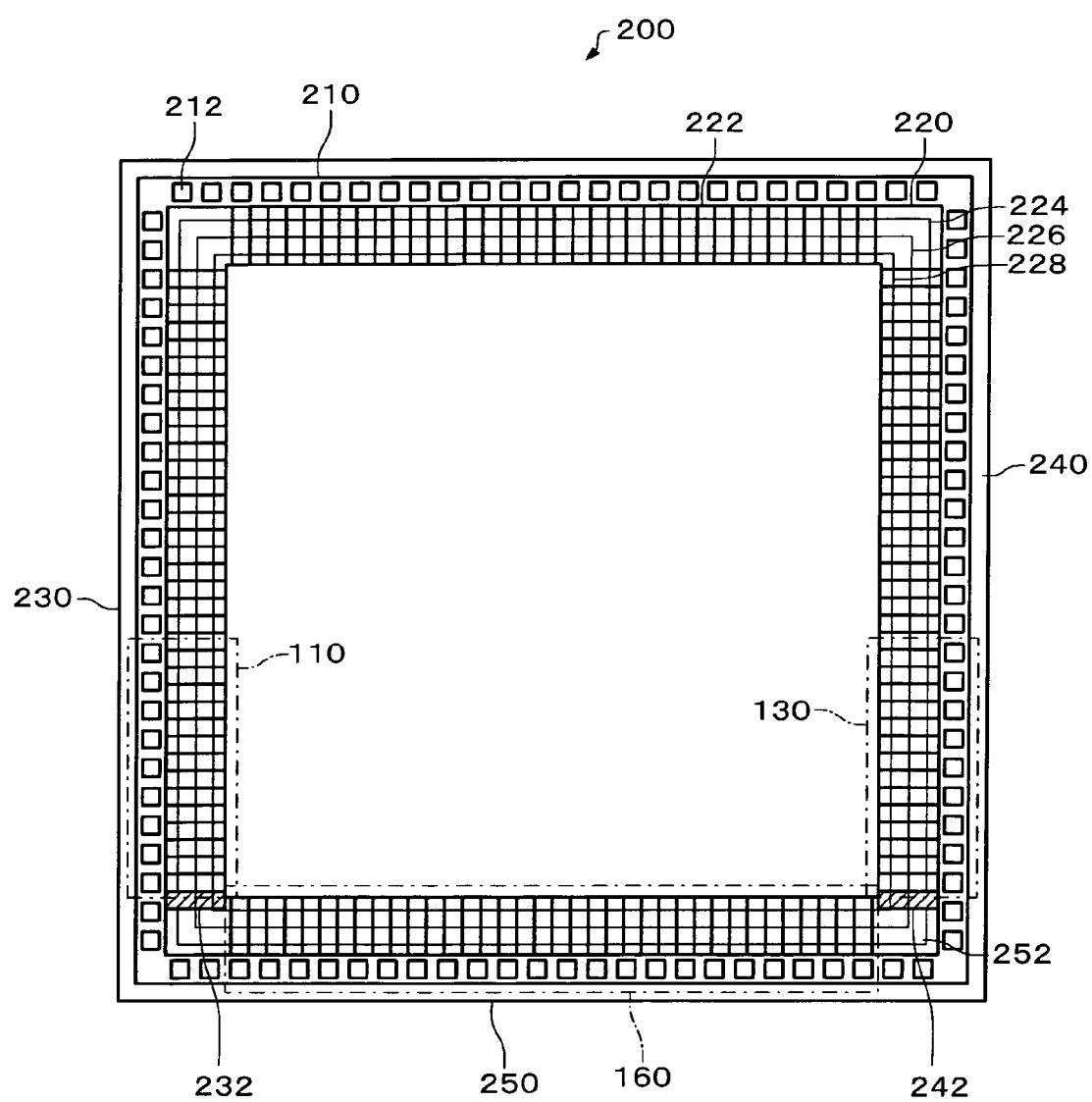
FIG. 5 is a diagram illustrative of an arrangement example of a first camera interface section, a second camera interface section, and a first memory interface section in a semiconductor integrated circuit device according to one embodiment of the invention.

FIG. 5 is a diagram illustrative of an arrangement example of the first camera interface section, the second camera interface section, and the first memory interface section in the semiconductor integrated circuit device according to this embodiment. The same elements as in FIG. 4 are indicated by the same symbols. Description of these elements is omitted. The semiconductor chip 200 includes the first camera interface section 110, the second camera interface section 130, and the first memory interface section 160. The first memory interface section 160 includes the electrode sections 212 and the input/output buffers 222. The electrode sections 212 and the input/output buffers 222 of the first memory interface section 160 are disposed in at least part of the electrode region 210 and the input/output buffer region 220 provided along a third side (250) of the semiconductor chip 200. The electrode sections 212 and the input/output buffers 222 of the first camera interface section 110 are disposed in the electrode region 210 and the input/output buffer region 220 at a position close to the intersection of the first side (230) and the third side (250) of the semiconductor chip 200. The electrode sections 212 and the input/output buffers 222 of the second camera interface section 130 are disposed in the electrode region 210 and the input/output buffer region 220 at a position close to the intersection of the second side (240) and the third side (250) of the semiconductor chip 200.

As described with reference to FIG. 2, when applying the semiconductor integrated circuit device according to this embodiment to a data recording device, data flows from the first camera interface section 110 and the second camera interface section 130 to the first memory interface section 160. The distance between the first camera interface section 110 and the and first memory interface section 160 and the distance between the second camera interface section 130 and the first memory interface section 160 can be reduced by disposing the first camera interface section 110 and the second camera interface section 130 along opposite sides at positions near the first memory interface section 160. Therefore, when image data imaged by two camera modules and supplied through the first camera interface section 110 and the second camera interface section 130 is recorded in the primary storage device through the first memory interface section 160, since the lengths of interconnects connected to the first camera interface section 110 and the second camera interface section 130 can be reduced, wiring efficiency can be increased. Moreover, since the operation of recording the image data in the primary storage device through the first memory interface section 160 can be increased in speed by reducing the lengths of interconnects, the amount of image data which can be stored per unit time can be increased. Therefore, a data recording device with high reliability and high evidential capacity can be provided using the semiconductor integrated circuit device according to this embodiment.

When the operating voltage of the first camera interface section 110 and the second camera interface section 130 differs from the operating voltage of the first memory interface section 160, the semiconductor chip 200 may include power supply separation cells 232 and 242 in order to separate the power supply of the first camera interface section 110 and the second camera interface section 130 from the power supply of the first memory interface section 160. The power supply separation cell need not include all or some of the high power supply voltage (HVDD) supply line, the low power supply voltage (LVDD) supply line, and the ground potential (VSS) supply line. In this example, the power supply separation cells 232 and 242 does not include the high power supply voltage (HVDD) supply line. Therefore, the power supply line (high power supply voltage supply line 224) of the first camera interface section 110 is separated from the power supply line (high power supply voltage supply line 252) of the first memory interface section 160 in the input/output buffer region 220 at a position close to the intersection of the first side (230) and the third side (250) of the semiconductor chip 200, and the power supply line (high power supply voltage supply line 224) of the second camera interface section 130 is separated from the power supply line (high power supply voltage supply line 252) of the first memory interface section 160 in the input/output buffer region 220 at a position close to the intersection of the second side (240) and the third side (250) of the semiconductor chip 200.

The electrode sections cannot be densely provided in the electrode region near the four corners of the semiconductor chip 200 due to difficulty in bonding. Therefore, even if a number of input/output buffers are provided in the input/output buffer region near the four corners of the semiconductor chip 200, these input/output buffers cannot be effectively utilized in combination with the electrode sections. The power supplies can be separated without adding a power supply separation region by providing the power supply separation cells in the input/output buffer region or directly cutting the power supply line near the four corners of the semiconductor chip 200.

Figure 6:
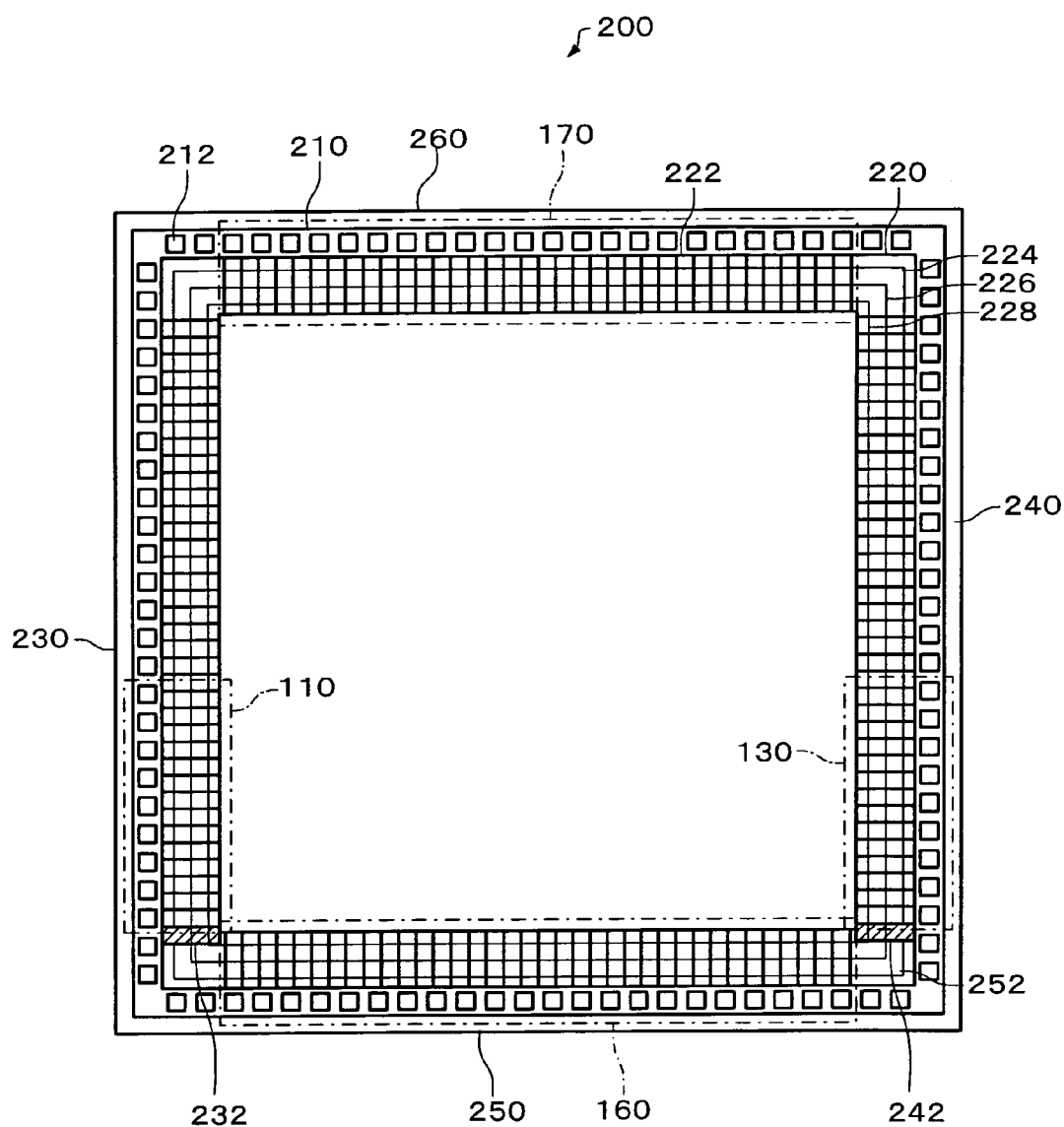
FIG. 6 is a diagram illustrative of an arrangement example of a first camera interface section, a second camera interface section, a first memory interface section, and a second memory interface section in a semiconductor integrated circuit device according to one embodiment of the invention.

FIG. 6 is a diagram illustrative of an arrangement example of the first camera interface section, the second camera interface section, the first memory interface section, and the second memory interface section in the semiconductor integrated circuit device according to this embodiment. The same elements as in FIG. 5 are indicated by the same symbols. Description of these elements is omitted. The semiconductor chip 200 includes the first camera interface section 110, the second camera interface section 130, the first memory interface section 160, and the second memory interface section 170. The second memory interface section 170 includes the electrode sections 212 and the input/output buffers 222. The electrode sections 212 and the input/output buffers 222 of the second memory interface section 170 are disposed in at least part of the electrode region 210 and the input/output buffer region 220 provided along a fourth side (260) of the semiconductor chip 200 opposite to the third side (250).

As described with reference to FIG. 2, when applying the semiconductor integrated circuit device according to this embodiment to a data recording device, data flows from the first camera interface section 110 and the second camera interface section 130 to the first memory interface section 160, and data flows from the first memory interface section 160 to the second memory interface section 170. An overlapping portion of a wiring region for data lines from the first camera interface section 110 and the second camera interface section 130 to the first memory interface section 160 and a wiring region for data lines from the first memory interface section 160 to the second memory interface section 170 can be effectively reduced by disposing the first memory interface section 160 and the second memory interface section 170 along the two sides differing from the two sides along which the first camera interface section 110 and the second camera interface section 130 are disposed.

When applying the semiconductor integrated circuit device according to this embodiment to a data recording device, the operation of recording image data in the primary storage device must be generally performed at a significantly high speed as compared with the operation of recording image data in the secondary storage device. The operation of recording image data in the primary storage device through the first memory interface section 160 can be increased in speed by disposing the first camera interface section 110 and the second camera interface section 130 near the first memory interface section 160.

Figure 7:
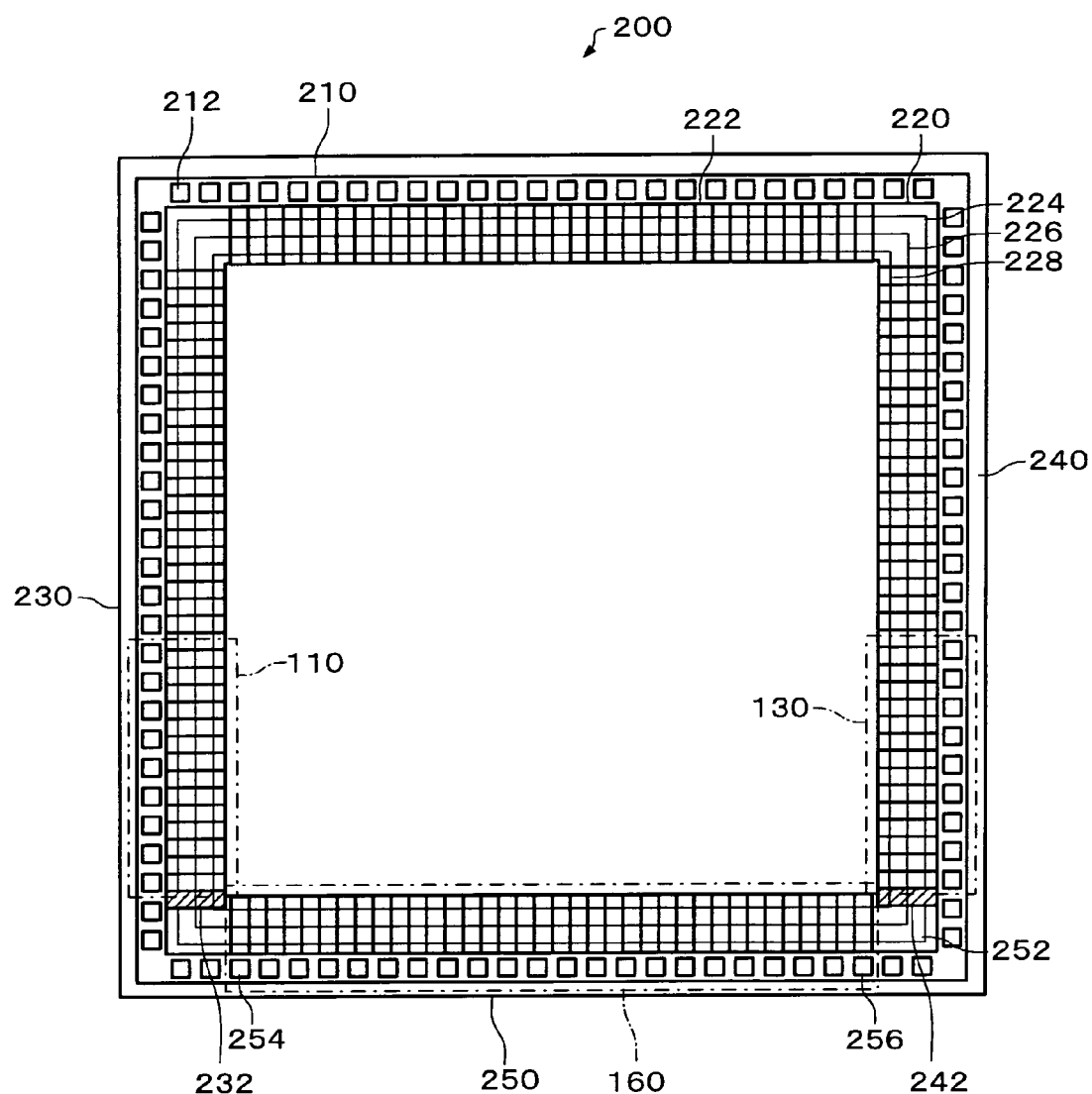
FIG. 7 is a diagram illustrative of an arrangement example of a first memory interface section of a semiconductor integrated circuit device according to one embodiment of the invention when the first memory interface section selectively provides a primary storage interface or a secondary storage interface based on a select signal.

FIG. 7 is a diagram illustrative of an arrangement example of the first memory interface section of the semiconductor integrated circuit device according to this embodiment when the first memory interface section selectively provides the primary storage interface or the secondary storage interface based on a select signal. The same elements as in FIG. 5 are indicated by the same symbols. Description of these elements is omitted. The first memory interface section 160 includes electrode sections 254 and 256 which output a select signal to the outside of the semiconductor chip 200, the select signal being used to selectively provide the primary storage interface which records image data supplied to the inside of the semiconductor chip 200 from the first camera interface section 110 and the second camera interface section 130 or image data obtained by converting the image data supplied from the first camera interface section 110 and the second camera interface section 130 in the primary storage device outside the semiconductor chip 200 and reads the recorded image data from the primary storage device or the secondary storage interface which records the image data recorded in the primary storage device or image data obtained by converting the image data recorded in the primary storage device in the secondary storage device. For example, the primary storage interface may be selected when the select signal (chip select signal) output from the electrode section 254 is active, and the secondary storage interface may be selected when the select signal (chip select signal) output from the electrode section 256 is active. The primary storage interface or the secondary storage interface may be selected based on the polarity of one select signal. All or some of the electrode sections of the first memory interface section 160 other than the electrode sections 254 and 256 may be used in common for the primary storage interface and the secondary storage interface.

As described with reference to FIG. 2, when applying the semiconductor integrated circuit device according to this embodiment to a data recording device, data flows from the first camera interface section 110 and the second camera interface section 130 to the first memory interface section 160, and data flows from the first memory interface section 160 to the second memory interface section 170. The data lines from the first memory interface section 160 to the second memory interface section 170 become unnecessary by causing the first memory interface section to selectively provide the primary storage interface or the secondary storage interface based on the select signal, whereby the wiring region can be reduced. As a result, wiring efficiency can be increased.

Figure 8:
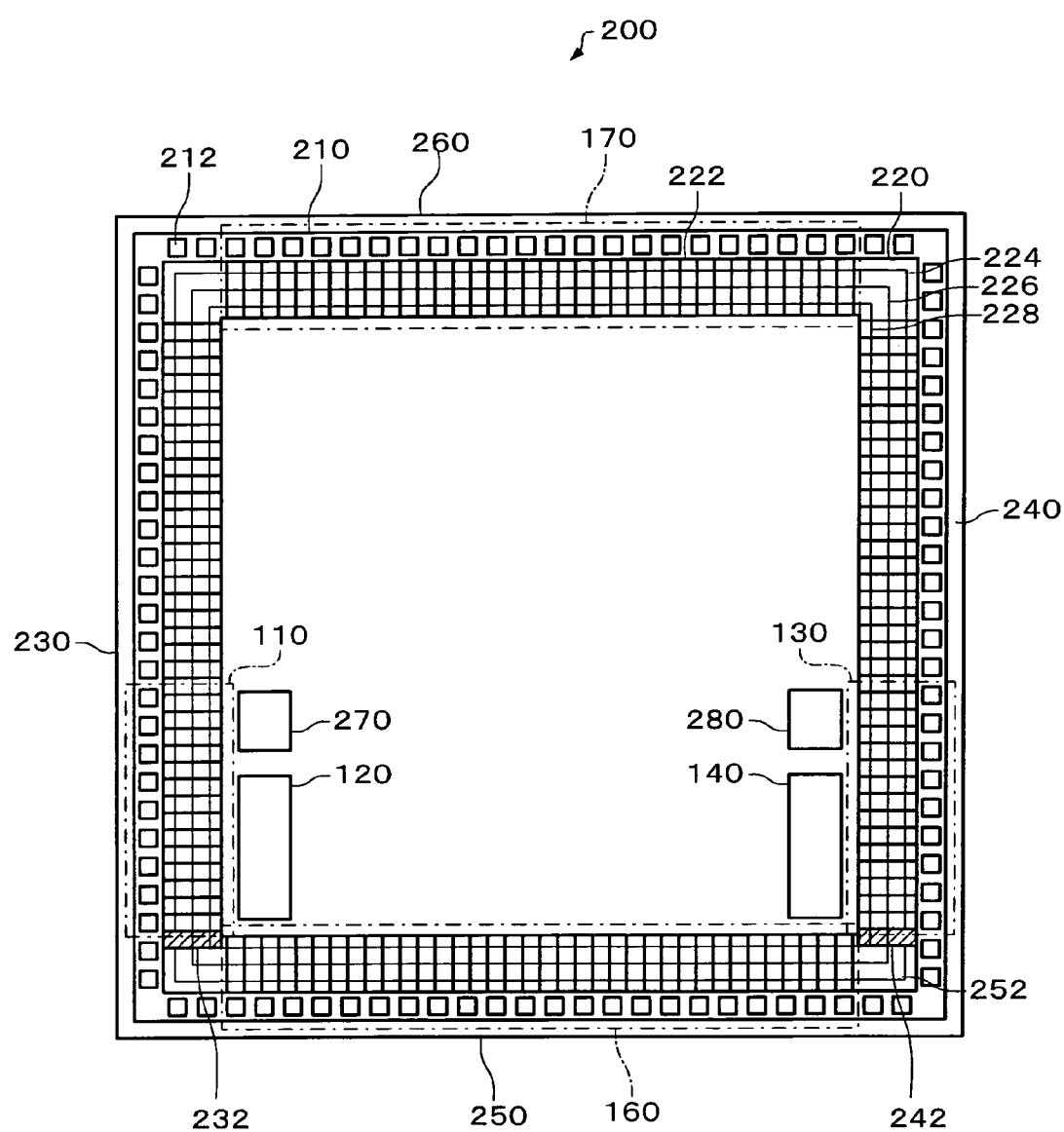
FIG. 8 is a diagram illustrative of an arrangement example of a first AD conversion section, a first image processing section, a second AD conversion section, and a second image processing section in the semiconductor integrated circuit device according to one embodiment of the invention.

FIG. 8 is a diagram illustrative of an arrangement example of a first AD conversion section, a first image processing section, a second AD conversion section, and a second image processing section in the semiconductor integrated circuit device according to this embodiment. The same elements as in FIG. 5 are indicated by the same symbols. Description of these elements is omitted. The semiconductor chip 200 includes a first AD conversion section 270. The first AD conversion section 270 converts analog image data supplied from the first camera interface section 110 to the inside of the semiconductor chip 200 into digital image data. The semiconductor chip 200 includes the first image processing section 120. The first image processing section 120 converts the digital image data converted by the first AD conversion section 270. The first AD conversion section 270 and the first image processing section 120 are disposed adjacent to the first camera interface section 110. The semiconductor chip 200 includes a second AD conversion section 280. The second AD conversion section 280 converts analog image data supplied from the second camera interface section 130 to the inside of the semiconductor chip 200 into digital image data. The semiconductor chip 200 includes the second image processing section 140. The second image processing section 140 converts the digital image data converted by the second AD conversion section 280. The second AD conversion section 280 and the second image processing section 140 are disposed adjacent to the second camera interface section 130.

A wiring region for interconnects between the first camera interface section 110 and the first AD conversion section 270 and the first image processing section 120 can be reduced, even if the first camera interface section 110 can input analog image data and digital image data, by disposing the first AD conversion section 270 and the first image processing section 120 adjacent to the first camera interface section 110. Moreover, the wiring region can be reduced even if the output from the first AD conversion section 270 is supplied to the input of the first image processing section 120.

Likewise, a wiring region for interconnects between the second camera interface section 130 and the second AD conversion section 280 and the second image processing section 140 can be reduced, even if the second camera interface section 130 can input analog image data and digital image data, by disposing the second AD conversion section 280 and the second image processing section 140 adjacent to the second camera interface section 130. Moreover, the wiring region can be reduced even if the output from the second AD conversion section 280 is supplied to the input of the second image processing section 140.

Note that the first AD conversion section 270 and the first image processing section 120 need not be disposed adjacently. It is desirable that the first AD conversion section 270 be disposed at a distance from the first image processing section 120 to prevent digital noise generated by the image processing section 120 from being superimposed on the analog image data input of the AD conversion section 270. Likewise, it is desirable that the second AD conversion section 280 be disposed at a distance from the second image processing section 140.

Figure 9:
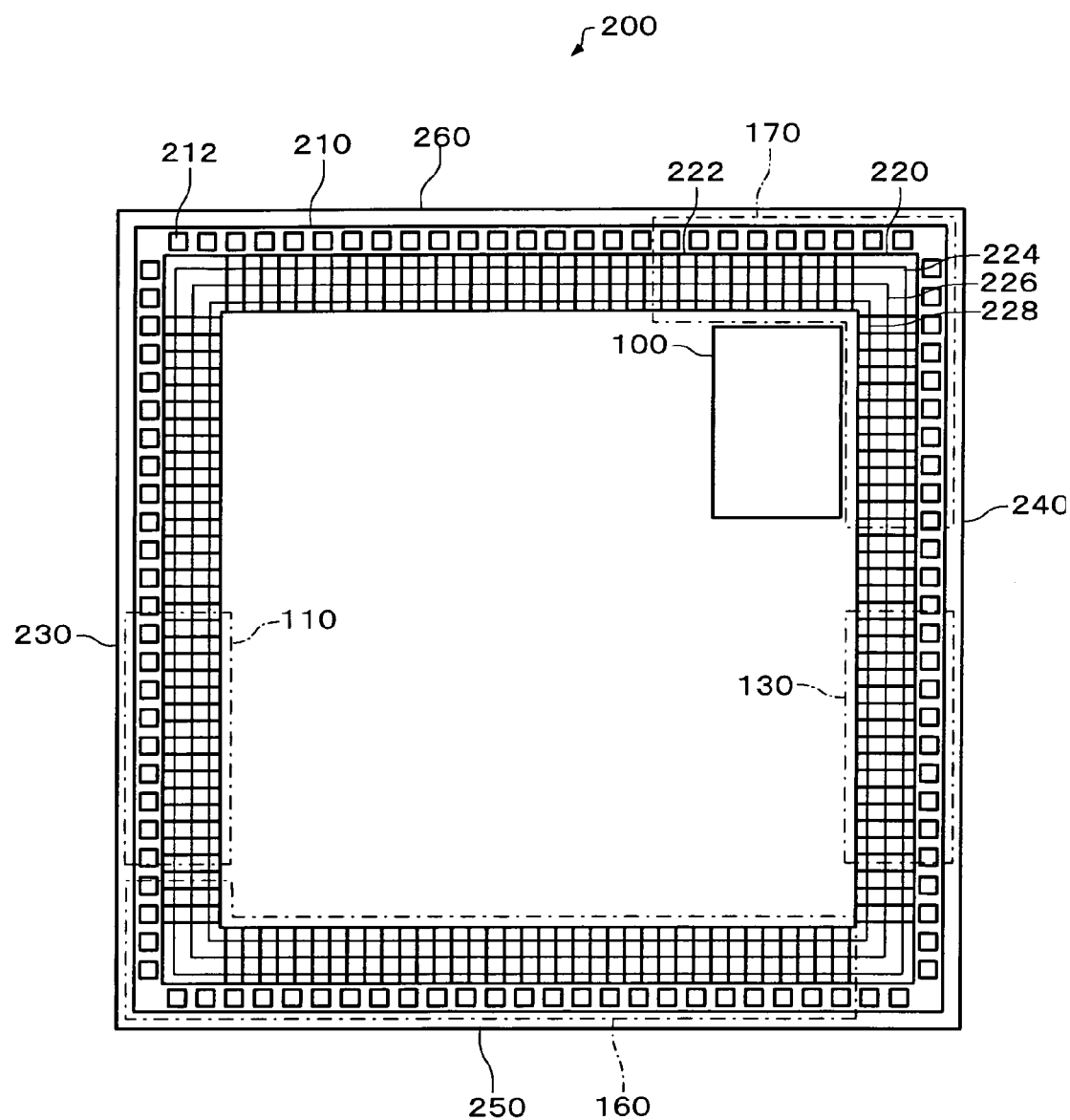
FIG. 9 is a diagram illustrative of an arrangement example of a first memory interface section and a second memory interface section in a semiconductor integrated circuit device according to one embodiment of the invention.

FIG. 9 is a diagram illustrative of another arrangement example of the first memory interface section and the second memory interface section in the semiconductor integrated circuit device according to this embodiment. The same elements as in FIG. 6 are indicated by the same symbols. Description of these elements is omitted.

The first memory interface section 160 includes the electrode sections 212 and the input/output buffers 222. Some of the electrode sections 212 and the input/output buffers 222 of the first memory interface section 160 are disposed in the electrode region 210 and the input/output buffer region 220 provided along the third side (250) of the semiconductor chip 200, and the remaining electrode sections 212 and input/output buffers 222 are disposed in the electrode region 210 and the input/output buffer region 220 provided along the first side (230). For example, when a large number of electrode sections 212 and input/output buffers 222 are included in the first memory interface section 160, all of the electrode sections 212 and the input/output buffers 222 may not be disposed in the electrode region 210 and the input/output buffer region 220 provided along the third side (250). In this case, some of the electrode sections 212 and the input/output buffers 222 of the first memory interface section 160 may be disposed in the electrode region 210 and the input/output buffer region 220 provided along the first side (230). Likewise, the electrode sections 212 and the input/output buffers 222 of the first memory interface section 160 may be disposed in the electrode region 210 and the input/output buffer region 220 provided along the third side (250) and the electrode region 210 and the input/output buffer region 220 provided along the second side (240).

The second memory interface section 170 includes the electrode sections 212 and the input/output buffers 222. Some of the electrode sections 212 and the input/output buffers 222 of the second memory interface section 170 are disposed in the electrode region 210 and the input/output buffer region 220 provided along the fourth side (260) of the semiconductor chip 200, and the remaining electrode sections 212 and input/output buffers 222 are disposed in the electrode region 210 and the input/output buffer region 220 provided along the second side (240). For example, in order to efficiently interconnect the CPU 100 and the second memory interface 170 when disposing the CPU 100 near the corner at which the fourth side (260) and the second side (240) intersect, some of the electrode sections 212 and the input/output buffers 222 of the second memory interface section may be disposed in the electrode region 210 and the input/output buffer region 220 provided along the fourth side (260), and the remaining electrode sections 212 and input/output buffers 222 may be disposed in the electrode region 210 and the input/output buffer region 220 provided along the second side (240). Likewise, the electrode sections 212 and the input/output buffers 222 of the second memory interface 170 may be disposed in the electrode region 210 and the input/output buffer region 220 provided along the fourth side (260) and the electrode region 210 and the input/output buffer region 220 provided along the first side (230).

Figure 10:
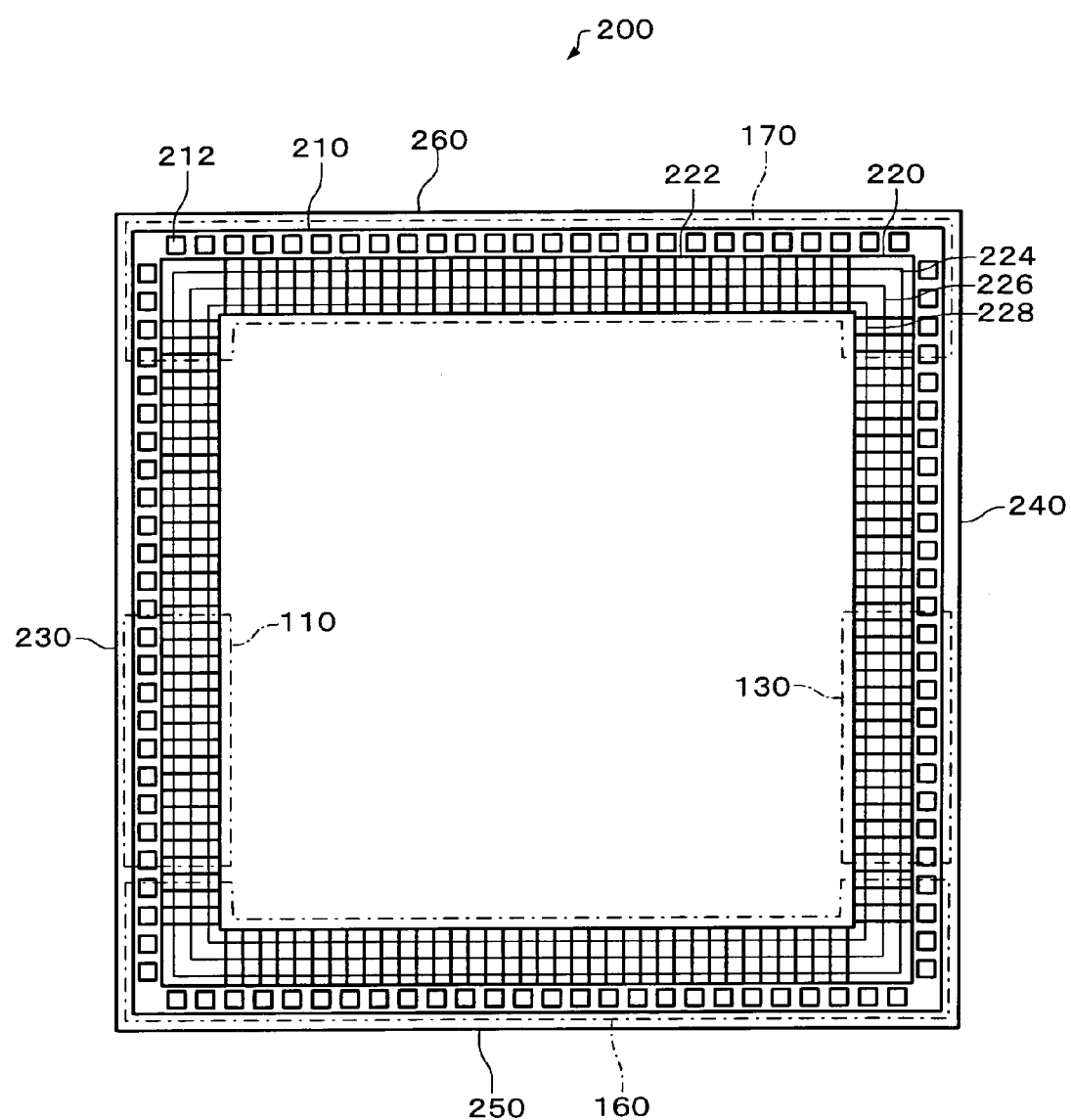
FIG. 10 is a diagram illustrative of another arrangement example of a first memory interface section and a second memory interface section in a semiconductor integrated circuit device according to one embodiment of the invention.

FIG. 10 is a diagram illustrative of a further arrangement example of the first memory interface section and the second memory interface section in the semiconductor integrated circuit device according to this embodiment. The same elements as in FIG. 6 are indicated by the same symbols. Description of these elements is omitted.

The first memory interface section 160 includes the electrode sections 212 and the input/output buffers 222. Some of the electrode sections 212 and the input/output buffers 222 of the first memory interface section 160 are disposed in the electrode region 210 and the input/output buffer region 220 provided along the third side (250) of the semiconductor chip 200, and the remaining electrode sections 212 and input/output buffers 222 are disposed in the electrode region 210 and the input/output buffer region 220 provided along the first side (230) and the electrode region 210 and the input/output buffer region 220 provided along the second side (240). For example, when a large number of electrode sections 212 and input/output buffers 222 are included in the first memory interface section 160, all of the electrode sections 212 and the input/output buffers 222 may not be disposed in the electrode region 210 and the input/output buffer region 220 provided along the third side (250). In this case, some of the electrode sections 212 and the input/output buffers 222 of the first memory interface section 160 may be disposed in the electrode region 210 and the input/output buffer region 220 provided along the first side (230) and the electrode region 210 and the input/output buffer region 220 provided along the second side (240).

The second memory interface section 170 includes the electrode sections 212 and the input/output buffers 222. Some of the electrode sections 212 and the input/output buffers 222 of the second memory interface section 170 are disposed in the electrode region 210 and the input/output buffer region 220 provided along the fourth side (260) of the semiconductor chip 200, and the remaining electrode sections 212 and input/output buffers 222 are disposed in the electrode region 210 and the input/output buffer region 220 provided along the first side (230) and the electrode region 210 and the input/output buffer region 220 provided along the second side (240). For example, when a large number of electrode sections 212 and input/output buffers 222 are included in the second memory interface section 170, all of the electrode sections 212 and the input/output buffers 222 may not be disposed in the electrode region 210 and the input/output buffer region 220 provided along the fourth side (260). In this case, some of the electrode sections 212 and the input/output buffers 222 of the second memory interface section 170 may be disposed in the electrode region 210 and the input/output buffer region 220 provided along the first side (230) and the electrode region 210 and the input/output buffer region 220 provided along the second side (240).

Figure 11:
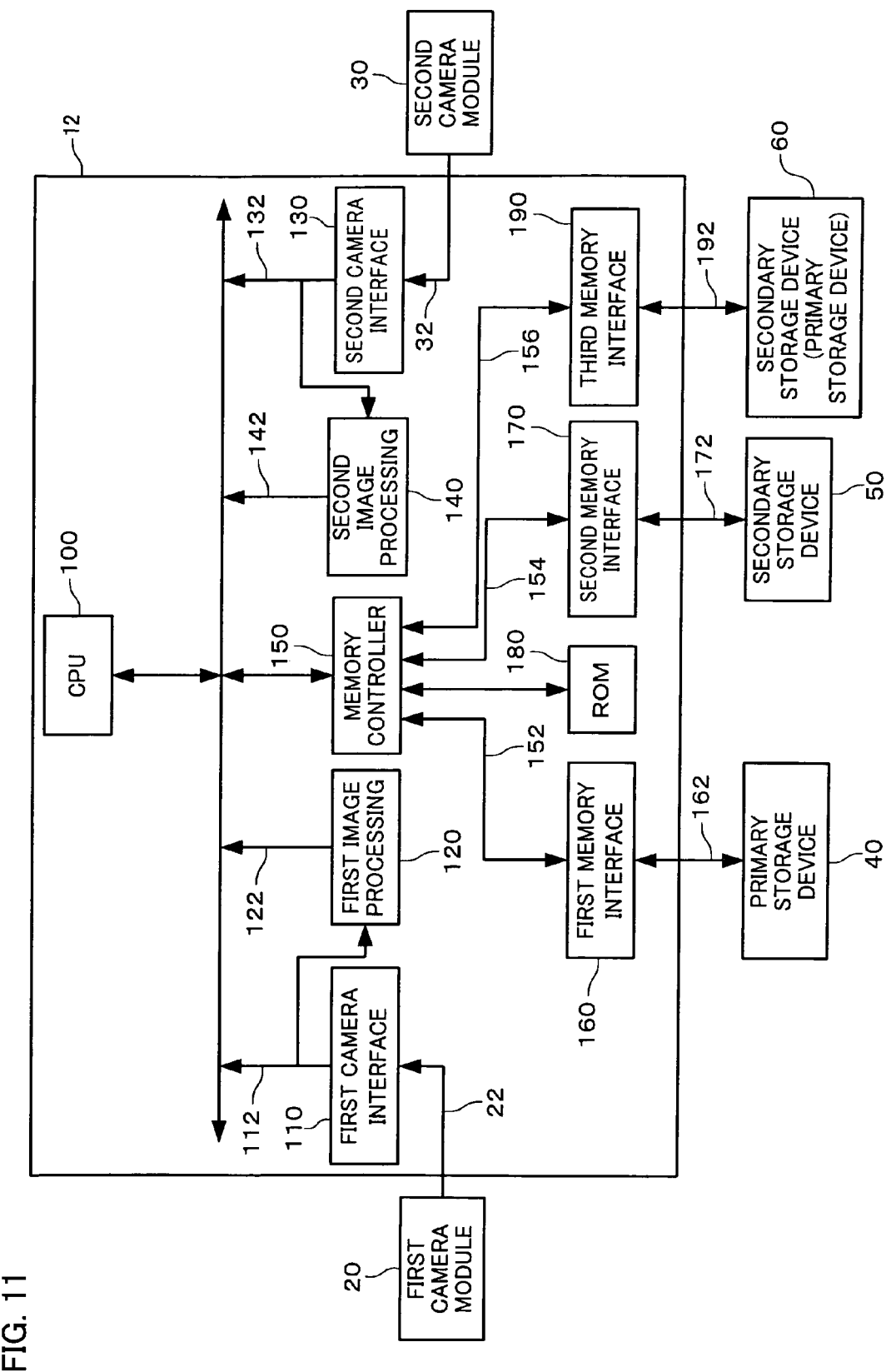
FIG. 11 is a functional block diagram showing another example of a semiconductor integrated circuit device according to one embodiment of the invention.

FIG. 11 shows another example of a functional block diagram of the semiconductor integrated circuit device according to this embodiment. The same elements as in FIG. 1 are indicated by the same symbols. Description of these elements is omitted.

A semiconductor integrated circuit device 12 includes a third memory interface section 190. The third memory interface section 190 provides a secondary storage interface which records image data recorded in the primary storage device 40 or image data obtained by converting the image data recorded in the primary storage device 40 in a secondary storage device 60 or a primary storage interface which records the image data 112 and the image data 132 respectively supplied from the first camera interface section 110 and the second camera interface section 130 or the image data 122 and the image data 142 obtained by converting the image data 112 and the image data 132 in a primary storage device 60 and reads the recorded image data from the primary storage device 60. The third memory interface section 190 may be a level shifter which shifts the voltage level of image data 192 or 156 in conformity with the internal power supply voltage of the semiconductor integrated circuit device 12 or the power supply voltage of the secondary storage device (or primary storage device) 60, or may be a digital input/output buffer when the internal power supply voltage of the semiconductor integrated circuit device 10 coincides with the power supply voltage of the secondary storage device (or primary storage device) 60, for example. The secondary storage device (or primary storage device) 60 may be a USB memory, for example. In this case, the memory controller 150 may also function as a USB controller which controls data transfer conforming to the USB standard between the CPU 100 and the secondary storage device (or primary storage device) 60 (USB memory).

Figure 12:
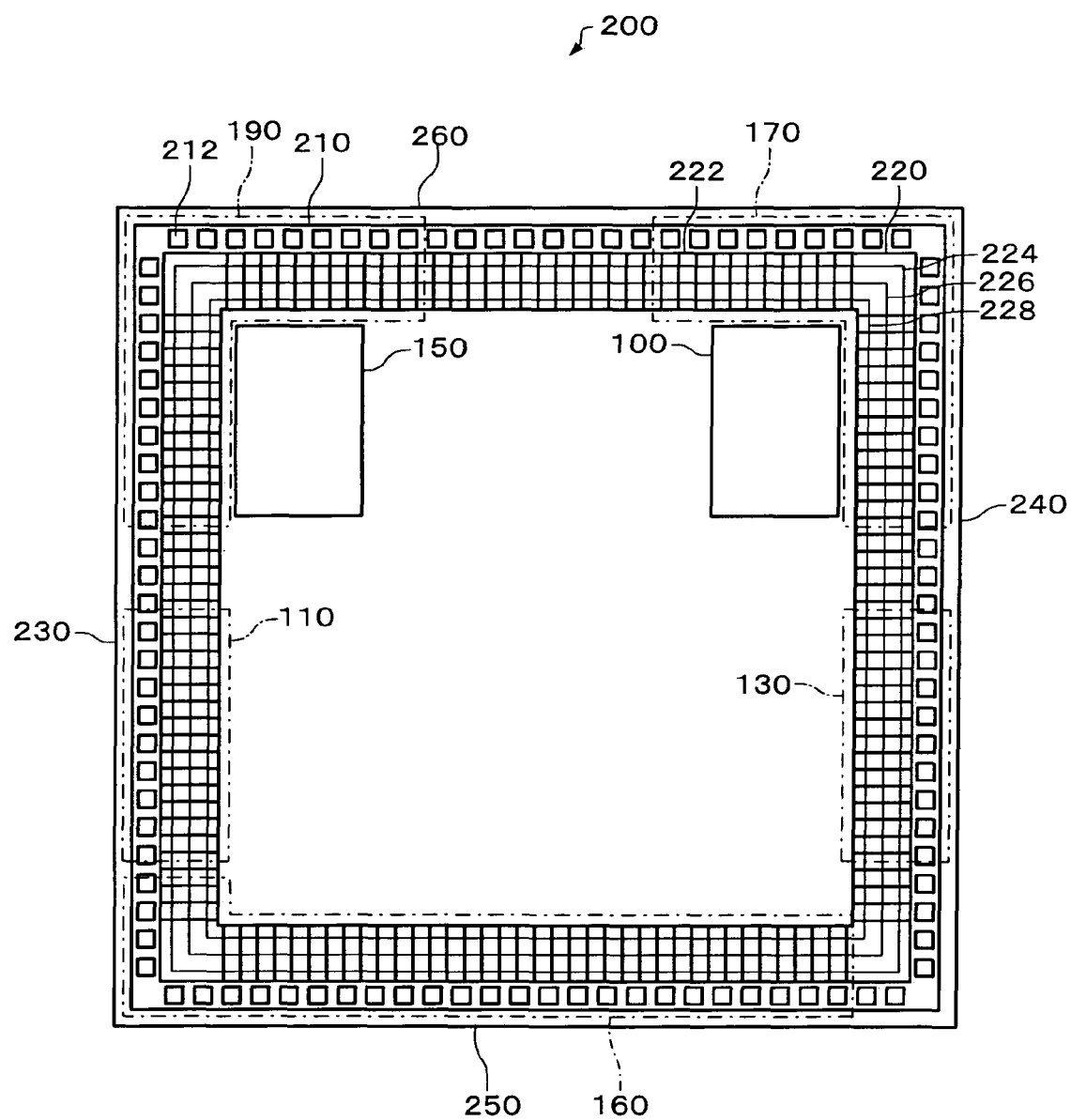
FIG. 12 is a diagram illustrative of an arrangement example of a third memory interface section in a semiconductor integrated circuit device according to one embodiment of the invention.

FIG. 12 is a diagram illustrative of an example of the third memory interface section in the semiconductor integrated circuit device according to this embodiment. The same elements as in FIG. 9 are indicated by the same symbols. Description of these elements is omitted.

The third memory interface section 190 includes the electrode sections 212 and the input/output buffers 222. Some of the electrode sections 212 and the input/output buffers 222 of the third memory interface section 190 are disposed in the electrode region 210 and the input/output buffer region 220 provided along the fourth side (260) of the semiconductor chip 200, and the remaining electrode sections 212 and input/output buffers 222 are disposed in the electrode region 210 and the input/output buffer region 220 provided along the first side (230). For example, when connecting a USB memory to the semiconductor integrated circuit device 12 as the secondary storage device (or primary storage device) 60, it is desirable that interconnects which connect the USB controller and the third memory interface section 190 be as short as possible in order to satisfy the USB specification. Therefore, the memory controller 150 which functions as the USB controller may be disposed near the corner at which the fourth side (260) and the first side (230) intersect. Some of the electrode sections 212 and the input/output buffers 222 of the third memory interface section 190 may be disposed in the electrode region 210 and the input/output buffer region 220 provided along the fourth side (260), and the remaining electrode sections 212 and input/output buffers 222 may be disposed in the electrode region 210 and the input/output buffer region 220 provided along the first side (230).

2. Data Recording Device

Figure 13:
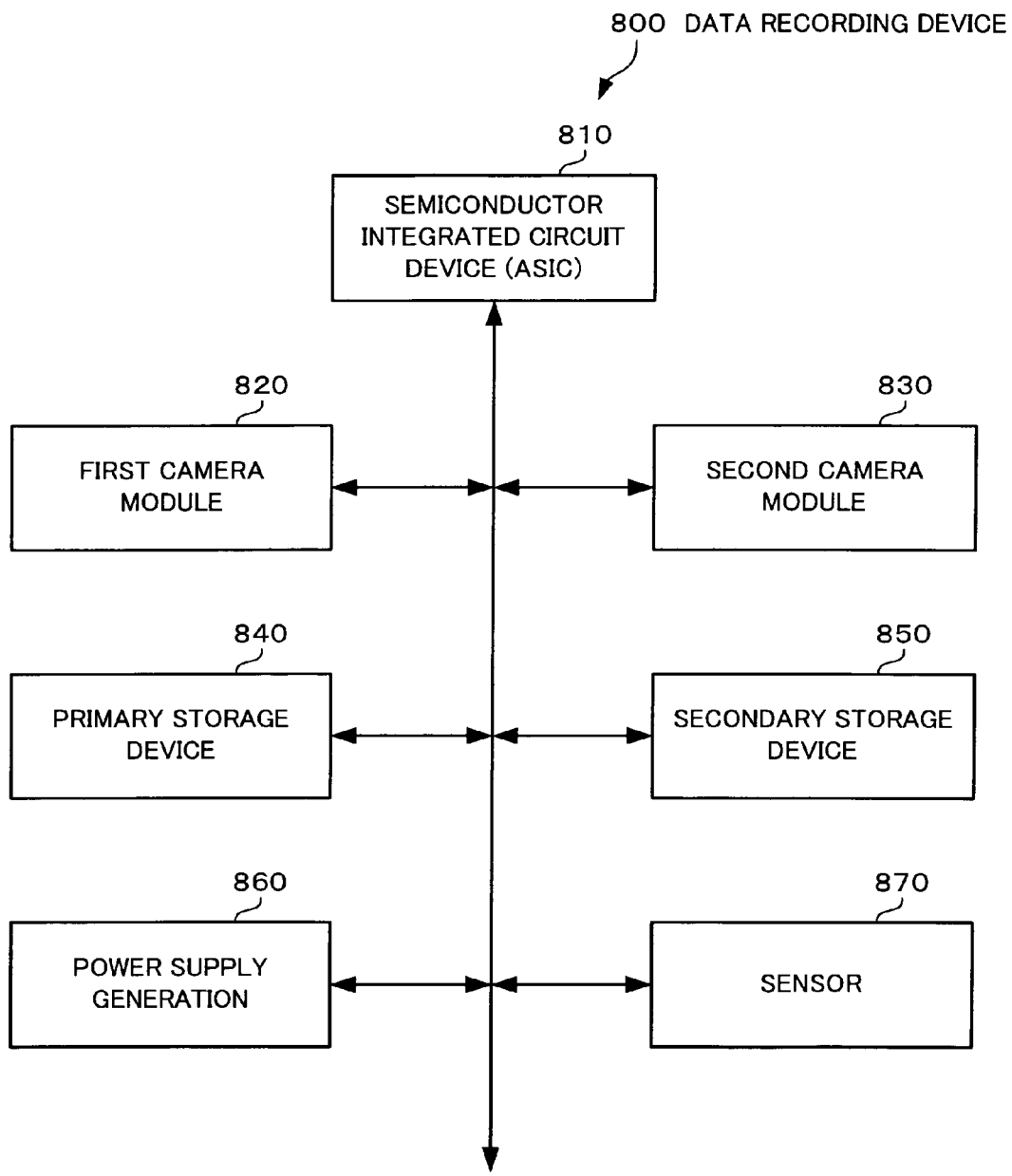
FIG. 13 is a block diagram showing an example of a data recording device including a semiconductor integrated circuit device according to one embodiment of the invention.

FIG. 13 shows an example of a block diagram of a data recording device according to one embodiment of the invention. A data recording device 800 includes a semiconductor integrated circuit device 810, a first camera module 820, a second camera module 830, a primary storage device 840, a secondary storage device 850, a power supply generation section 860, and a sensor 870.

The first camera module 820 and the second camera module 830 take images at regular time intervals. The primary storage device 840 temporarily and sequentially stores a set of image data imaged by the first camera module 820 and the second camera module 830 at the same time. The primary storage device 840 may be a volatile memory such as a synchronous DRAM (SDRAM). The secondary storage device 850 stores necessary sets of image data selected from the sets of image data recorded in the primary storage device 840 for a long time. The secondary storage device 850 may be a nonvolatile memory such as a flash memory. For example, the secondary storage device 850 may be a storage medium such as a compact flash (CF) memory card or a secure digital (SD) memory card. The power supply generation section 860 generates various power supplies used in the data recording device 800. The sensor 870 detects occurrence of a predetermined event (e.g., sudden increase in acceleration at the time of accident).

The semiconductor integrated circuit device 810 cyclically and sequentially records a set of image data imaged by the first camera module 820 and the second camera module 830 at the same time in a predetermined storage area of the primary storage device 840 at regular time intervals. When the semiconductor integrated circuit device 810 has determined that a predetermined event has occurred based on the output from the sensor 870, the semiconductor integrated circuit device 810 continues to record a set of image data in the primary storage device 840, and sequentially reads sets of image data recorded within a predetermined period of time before the event has occurred from the primary storage device 840 in time series and sequentially records the sets of image data in the secondary storage device 850.

The data recording device 800 may be a drive recorder which is installed in an automobile and records an image in front of the automobile and an image inside the automobile before and after an accident has occurred, for example.

The data recording device 800 may include a device which converts image data (YUV data or RGB data) imaged by the first camera module and the second camera module, and the converted image data may be supplied to the semiconductor integrated circuit device 810. For example, the data recording device 800 may include a device which subjects the outputs from the first camera module and the second camera module to JPEG encoding or IP conversion.

The invention is not limited to the above-described embodiments, and various modifications can be made within the scope of the invention.

The invention includes various other configurations substantially the same as the configurations described in the embodiments (in function, method and result, or in objective and result, for example). The invention also includes a configuration in which an unsubstantial portion in the described embodiments is replaced. The invention also includes a configuration having the same effects as the configurations described in the embodiments, or a configuration able to achieve the same objective. Further, the invention includes a configuration in which a publicly known technique is added to the configurations in the embodiments.

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A semiconductor integrated circuit device including a semiconductor chip, the semiconductor chip having a square or rectangular shape and including an electrode region disposed along first to fourth sides of the semiconductor chip and provided with a plurality of electrode sections, and an input/output buffer region disposed along the electrode region and provided with a plurality of input/output buffers, the semiconductor integrated circuit device comprising:

a first image data interface section including at least two of the electrode sections and at least two of the input/output buffers and providing an interface for supplying image data to the semiconductor chip; and a second image data interface section including at least two of the electrode sections and at least two of the input/output buffers and providing an interface for supplying image data to the semiconductor chip, the electrode sections and the input/output buffers of the first image data interface section being included in part of the electrode region and part of the input/output buffer region disposed along the first side of the semiconductor chip; and the electrode sections and the input/output buffers of the second image data interface section being included in part of the electrode region and part of the input/output buffer region disposed along the second side of the semiconductor chip opposite to the first side.

2. The semiconductor integrated circuit device as defined in claim 1, wherein the electrode sections and the input/output buffers of the second image data interface section are disposed opposite to the electrode sections and the input/output buffers of the first image data interface section.

3. The semiconductor integrated circuit device as defined in claim 1, further comprising:

a first memory interface section including at least two of the electrode sections and at least two of the input/output buffers and providing a primary storage interface for recording the image data supplied from the first image data interface section and the second image data interface section or converted image data obtained by converting the image data in a primary storage device provided outside the semiconductor chip and for reading the recorded image data from the primary storage device, wherein at least part of the electrode sections and at least part of the input/output buffers of the first memory interface section are included in part of the electrode region and part of the input/output buffer region disposed along the third side of the semiconductor chip.

4. The semiconductor integrated circuit device as defined in claim 2, further comprising:

a first memory interface section including at least two of the electrode sections and at least two of the input/output buffers and providing a primary storage interface for recording the image data supplied from the first image data interface section and the second image data interface section or converted image data obtained by converting the image data in a primary storage device provided outside the semiconductor chip and for reading the recorded image data from the primary storage device, wherein at least part of the electrode sections and at least part of the input/output buffers of the first memory interface section are included in part of the electrode region and part of the input/output buffer region disposed along the third side of the semiconductor chip.

5. The semiconductor integrated circuit device as defined in claim 3, wherein the electrode sections and the input/output buffers of the first image data interface section are disposed in the electrode region and the input/output buffer region at a position close to an intersection of the first side and the third side of the semiconductor chip; and wherein the electrode sections and the input/output buffers of the second image data interface section are disposed in the electrode region and the input/output buffer region at a position close to an intersection of the second side and the third side of the semiconductor chip.

6. The semiconductor integrated circuit device as defined in claim 5, wherein a power supply line of the first image data interface section is separated from a power supply line of the first memory interface section in the input/output buffer region at a position close to the intersection of the first side and the third side of the semiconductor chip; and wherein a power supply line of the second image data interface section is separated from the power supply line of the first memory interface section in the input/output buffer region at a position close to the intersection of the second side and, the third side of the semiconductor chip.

7. The semiconductor integrated circuit device as defined in claim 3, wherein at least one of the electrode sections of the first memory interface section outputs a select signal to the outside of the semiconductor chip, the select signal being used to selectively provide the primary storage interface or a secondary storage interface, the secondary storage interface being used to record the image data in the primary storage device or converted image data obtained by converting the image data in the primary storage device in a secondary storage device provided outside the semiconductor chip.

8. The semiconductor integrated circuit device as defined in claim 5,
wherein at least one of the electrode sections of the first memory interface section outputs a select signal to the outside of the semiconductor chip, the select signal being used to selectively provide the primary storage interface or a secondary storage interface, the secondary storage interface being used to record the image data in the primary storage device or converted image data obtained by converting the image data in the primary storage device in a secondary storage device provided outside the semiconductor chip.

9. The semiconductor integrated circuit device as defined in claim 3, further comprising:
a second memory interface section including at least two of the electrode sections and at least two of the input/output buffers and providing a secondary storage interface for recording the image data in the primary storage device or converted image data obtained by converting the image data in the primary storage device in a secondary storage device provided outside the semiconductor chip,
wherein at least part of the electrode sections and at least part of the input/output buffers of the second memory interface section are included in part of the electrode region and part of the input/output buffer region disposed along the fourth side of the semiconductor chip opposite to the third side.

10. The semiconductor integrated circuit device as defined in claim 9, further comprising:
a third memory interface section including at least two of the electrode sections and at least two of the input/output buffers and providing the secondary storage interface or the primary storage interface,
wherein at least part of the electrode sections and at least part of the input/output buffers of the third memory interface section are included in part of the electrode region and part of the input/output buffer region disposed along the fourth side.

11. The semiconductor integrated circuit device as defined in claim 10,
wherein part of the electrode sections and part of the input/output buffers of the third memory interface section are disposed in part of the electrode region and part of the input/output buffer region disposed along the first side.

12. The semiconductor integrated circuit device as defined in claim 1, further comprising:
a first image processing section performing conversion processing on the image data supplied from the first image data interface section to the semiconductor chip; and
a second image processing section performing conversion processing on the image data supplied from the second image data interface section to the semiconductor chip,
wherein the first image processing section is disposed adjacent to the first image data interface section; and
wherein the second image processing section is disposed adjacent to the second image data interface section.

13. The semiconductor integrated circuit device as defined in claim 2, further comprising:
a first image processing section performing conversion processing on the image data supplied from the first image data interface section to the semiconductor chip; and
a second image processing section performing conversion processing on the image data supplied from the second image data interface section to the semiconductor chip,
wherein the first image processing section is disposed adjacent to the first image data interface section; and
wherein the second image processing section is disposed adjacent to the second image data interface section.

14. The semiconductor integrated circuit device as defined in claim 1, further comprising:
a first AD conversion section converting analog image data supplied from the first image data interface section to the semiconductor chip into digital image data; and
a second AD conversion section converting analog image data supplied from the second image data interface section to the semiconductor chip into digital image data,
wherein the first AD conversion section is disposed adjacent to the first image data interface section; and
wherein the second AD conversion section is disposed adjacent to the second image data interface section.

15. The semiconductor integrated circuit device as defined in claim 2, further comprising:
a first AD conversion section converting analog image data supplied from the first image data interface section to the semiconductor chip into digital image data; and
a second AD conversion section converting analog image data supplied from the second image data interface section to the semiconductor chip into digital image data,
wherein the first AD conversion section is disposed adjacent to the first image data interface section; and
wherein the second AD conversion section is disposed adjacent to the second image data interface section.

16. The semiconductor integrated circuit device as defined in claim 14, further comprising:
a first image processing section performing conversion processing on the digital image data converted by the first AD conversion section; and
a second image processing section performing conversion processing on the digital image data converted by the second AD conversion section,
wherein the first image processing section is disposed adjacent to the first image data interface section; and
wherein the second image processing section is disposed adjacent to the second image data interface section.

17. The semiconductor integrated circuit device as defined in claim 1,
wherein the first image data interface section provides an interface supplying image data imaged by a first camera module provided outside the semiconductor chip or converted image data obtained by converting the image data imaged by the first camera module to the semiconductor chip; and
wherein the second image data interface section provides an interface supplying image data imaged by a second camera module provided outside the semiconductor chip or converted image data obtained by converting the image data imaged by the second camera module to the semiconductor chip.

18. The semiconductor integrated circuit device as defined in claim 2,
wherein the first image data interface section provides an interface supplying image data imaged by a first camera module provided outside the semiconductor chip or converted image data obtained by converting the image data imaged by the first camera module to the semiconductor chip; and wherein the second image data interface section provides an interface supplying image data imaged by a second camera module provided outside the semiconductor chip or converted image data obtained by converting the image data imaged by the second camera module to the semiconductor chip.

19. A data recording device comprising:
the semiconductor integrated circuit device as defined in claim 17;
a first camera module;
a second camera module;
a primary storage device; and
a secondary storage device.

20. A layout method for a semiconductor integrated circuit device including a semiconductor chip, the semiconductor chip having a square or rectangular shape and including an electrode region disposed along first to fourth sides of the semiconductor chip and provided with a plurality of electrode sections, and an input/output buffer region disposed along the electrode region and provided with a plurality of input/output buffers, the semiconductor integrated circuit device including:
a first image data interface section including at least two of the electrode sections and at least two of the input/output buffers and providing an interface for supplying image data to the semiconductor chip;

a second image data interface section including at least two of the electrode sections and at least two of the input/output buffers and providing an interface for supplying image data to the semiconductor chip; and a first memory interface section including at least two of electrode sections and at least two of input/output buffers and providing an interface for recording the image data supplied from the first image data interface section and the second image data interface section or converted image data obtained by converting the image data in a primary storage device provided outside the semiconductor chip and for reading the recorded image data from the primary storage device, the method comprising:
including the electrode sections and the input/output buffers of the first image data interface section in part of the electrode region and part of the input/output buffer region disposed along the first side of the semiconductor chip;

including the electrode sections and the input/output buffers of the second image data interface section in part of the electrode region and part of the input/output buffer region disposed along the second side of the semiconductor chip opposite to the first side; and including at least part of the electrode sections and at least part of the input/output buffers of the first memory interface section in part of the electrode region and part of the input/output buffer region disposed along the third side of the semiconductor chip.

* * * * *